(12) United States Patent
Rahman et al.

(10) Patent No.: US 10,266,746 B1
(45) Date of Patent: Apr. 23, 2019

(54) METHOD OF PUMPING AND CURING A CEMENT SLURRY INTO A WELL BORE

(71) Applicant: KING FAHD UNIVERSITY OF PETROLEUM AND MINERALS, Dhahran (SA)

(72) Inventors: Muhammad Kalimur Rahman, Dhahran (SA); Mirza Talha Baig, Dhahran (SA); Abdulaziz Al-Majed, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 0 days.

(21) Appl. No.: 16/169,649

(22) Filed: Oct. 24, 2018

Related U.S. Application Data

(63) Continuation of application No. 15/941,350, filed on Mar. 30, 2018, now Pat. No. 10,150,904.

(51) Int. Cl.
| | |
|---|---|
| *E21B 33/14* | (2006.01) |
| *C09K 8/467* | (2006.01) |
| *C04B 22/06* | (2006.01) |
| *C04B 28/02* | (2006.01) |
| *C04B 14/04* | (2006.01) |
| *C04B 28/04* | (2006.01) |

(52) U.S. Cl.
CPC ............ *C09K 8/467* (2013.01); *C04B 14/043* (2013.01); *C04B 14/047* (2013.01); *C04B 22/064* (2013.01); *C04B 28/02* (2013.01); *C04B 28/04* (2013.01); *E21B 33/14* (2013.01); *C09K 2208/10* (2013.01)

(58) Field of Classification Search
CPC .......... C09K 8/467; C04B 28/02; E21B 33/14
USPC .......................................................... 166/293
See application file for complete search history.

(56) References Cited

U.S. PATENT DOCUMENTS

| | | | |
|---|---|---|---|
| 6,989,057 B2 | 1/2006 | Getzlaf et al. | |
| 8,940,670 B2 | 1/2015 | Patil et al. | |
| 2004/0112600 A1* | 6/2004 | Luke .................... | C04B 14/047 166/295 |
| 2007/0029088 A1* | 2/2007 | Di Lullo Arias ..... | C04B 14/047 166/292 |
| 2007/0056732 A1 | 3/2007 | Roddy et al. | |
| 2014/0332217 A1 | 11/2014 | Rahman et al. | |
| 2017/0240469 A1 | 8/2017 | Rahman et al. | |

OTHER PUBLICATIONS

Mirza Talha Baig, et al., "Application of Nanotechnology in Oil Well Cementing", Society of Petroleum Engineers, SPE Kuwait Oil & Gas Show and Conference, Oct. 1-18, Kuwait City, Kuwait, 2017, pp. 1-3.

(Continued)

*Primary Examiner* — Catherine Loikith
*Assistant Examiner* — Ashish K Varma
(74) *Attorney, Agent, or Firm* — Oblon, McClelland, Maier & Neustadt, L.L.P.

(57) ABSTRACT

The present invention discusses methods for making a cement composition comprising a nanoparticle zeolite. The addition of the nanoparticle zeolite may provide enhanced compressive and tensile strengths, improved rheology, and a change to the cement microstructure. These effects may improve the cement's use as a cement sheath in drilling operations and under high pressure and high temperature (HPHT) conditions.

10 Claims, 14 Drawing Sheets

(56) References Cited

OTHER PUBLICATIONS

Hossein Mola-Abasi, et al., "Effect of Natural Zeolite and Cement Additive on the Strength of Sand", Geotechnical and Geological Engineering, vol. 34, Issue 5, Oct. 2016, pp. 1539-1551.

Hossein Mola-Abasi, et al., "Influence of zeolite and cement additions on mechanical behavior of sandy soil", Journal of Rock Mechanics and Geotechnical Engineering, vol. 8, Jun. 28, 2016, pp. 746-752.

Partha Sarathi Deb, et al., "Effects of nano-silica on the strength development of geopolymer cured at room temperature", Construction and Building Materials, vol. 101, Part 1, Dec. 30, 2015, pp. 675-683.

Alireza S. Khorasani, et al., "The Effects of Nanoparticles of Silica an Alumina on Flow Ability and Compressive Strength of Cementitious Composites", Key Engineering Materials (/KEM), vol. 631, Nov. 2014, pp. 119-127.

Mirza Talha Baig, et al., "Evaluation of Nano Zeolite as an Additive for Oil-Well Cementing", King Fahd University of Petroleum & Minerals, May 2017, pp. 1-165.

\* cited by examiner

METHOD OF PUMPING AND CURING A CEMENT SLURRY INTO A WELL BORE

CROSS-REFERENCE TO RELATED APPLICATIONS

The present application is a Continuation of Ser. No. 15/941,350, now allowed, having a filing date of Mar. 30, 2018.

STATEMENT REGARDING PRIOR DISCLOSURES BY THE INVENTORS

Aspects of this technology were disclosed in a thesis defense titled, "Evaluation of Nano zeolite as an Additive for Oil-Well Cementing," presented by Baig, Mirza Talha on May 25, 2017 at King Fahd University of Petroleum & Minerals (KFUPM), Dhahran, Saudi Arabia, and is herein incorporated by reference in its entirety.

BACKGROUND OF THE INVENTION

Technical Field

The present invention relates to a method of making a cured cement material comprising a nanoparticle-sized zeolite.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Oil and gas production and its exploration influence the world's economic structure. Conventional petroleum reservoirs are being exhausted because of the increase in economic activity in recent decades. To bridge the gap between supply and demand of petroleum products, engineers are now exploring reserves which were neglected in the past due to various complications associated with extraction. Technological advancements in the field of petroleum engineering have now enabled researchers to cope with the problems efficiently and improve the overall success of operations. To exploit the unconventional resources of petroleum, new techniques must be established simultaneously with an improvement in existing techniques.

In oil and gas wells after drilling the wellbore is completed, a pipe string runs into the wellbore, and a cement slurry is pumped into the annular space between the pipe casing and the formation rock to hold the pipe string in place. This process is referred to as "primary cementing." The fluid cement slurry hardens as the chemical reaction involving the formation of calcium silicate hydrate (CSH) by water, $C_3S$, $C_2S$, and $C_4AF$ takes place. The hardened to cement sheath forms a layer separating the wellbore formation and the casing, which is adhered firmly to the formation and the casing. The cement in the annular space holds the casing in place, and being impermeable, prevents the transport of corrosive fluid from the formation to the casing, thereby precluding the corrosion of the pipe string. It also provides a barrier that inhibits the migration of gases in the micro annulus between the formation and the cement, and the cement and pipe casing.

Cementing in high pressure high temperature (HPHT) wells is complicated due to wide ranging temperature and pressure variations and stresses to which the annular cement sheath, located between the casing and the formation, is subjected during its service life. The long-term integrity and durability of the annular cement depends on providing casing support and preventing the migration of formation fluid in liquid or gaseous form through or at the boundaries of the cement sheath. The zonal isolation requires a robust cement slurry which provides a strong and durable cement-casing and cement-formation bonding, precludes bulk shrinkage by inhibiting the fluid loss, has zero free water settling of cement, and does not form a micro annulus due to stress imbalance at the interface resulting from thermal regimes, hydraulic pressure or mechanical stresses. The hardened cement slurry should also resist radial fracturing that may result from shrinkage stresses, thermal expansion or contraction of the steel casing and pressure fluctuation, mechanical impact, or other conditions within the casing. The HPHT wells have a larger probability of migration of gas and corrosive fluid and leakage. Therefore, special attention must be paid to cementing processes, especially in HPHT wells. Studies have shown that approximately 80% of the wells in the Gulf of Mexico have gas transmitted to the surface through the cement casing.

In HPHT formations, the wells are exposed to high temperature variations that unsettle the formation as well as the casing, initiating expansion and contraction. In addition, HPHT wells are subjected to high loads in the lifetime of the well; this may destroy the integrity of cement and may produce cracks due to compaction loads. Gas migration and strength retrogression are major challenges in HPHT well cementing.

Gas migration is one of the major failures of primary cementing jobs resulting in loss of production and requires costly remedial cementing jobs to fix the well. One of the major causes behind the Gulf of Mexico oil spill incident was the poor cementing job; in that incident the annulus cement barrier could not stop the flow of hydrocarbons. Some important cement properties such as, free water, fluid loss, and static gel-strength transition time, were not evaluated prior to the cementing job. See Garg, T., & Gokavarapu, S. (2012). Lessons Learnt from Root Cause Analysis of Gulf of Mexico Oil Spill 2010, (December), 10-12, incorporated herein by reference in its entirety. Most HPHT environments are in gas production horizons, so it is a major concern in HPHT wells as gas may migrate through the cement micro cracks. See Shaughnessy, J., & Helweg, J. (2002). Optimizing HTHP Cementing Operations. IADC/SPE Drilling Conference, 26-28 February, Dallas, Tex. IADC/SPE-74483-MS. DOI: 10.2118/74483-MS, incorporated herein by reference in its entirety. Gas migration causes poor zonal isolation, which in some cases may even lead to production decline. Therefore, effort must be exercised to achieve effective zonal isolation and prevent fluid migration in the well. See Boniface, A. (2013). Effects of Thickening Time on the Application of Cement Slurry for High Pressure/High Temperature Drilling. 4(3), 32-41, incorporated herein by reference in its entirety. Required cement slurry properties for avoiding gas migration are minimum transition time, good fluid loss control, minimum free water development, and good mechanical properties. See Drecq, P., & Parcevaux, P. (1988). A single technique solves gas migration problems across a wide range of conditions. Presented at the International Meeting on Petroleum, Tianjin, China, 1-4 November. SPE-17629-MS. DOI: 10.2118/17629-MS, incorporated herein by reference in its entirety.

Strength retrogression, which is the deterioration of cement's compressive strength at elevated temperatures, is particularly common in high temperature wells. See Iverson, B., Maxson, J., & Bour, D. (2010). Strength Retrogression in Cements Under High Temperature Conditions. Proceeding: Thirty-Fifth Workshop on Geothermal Reservoir Engineering, incorporated herein by reference in its entirety. As the wellbore temperature exceeds 230° F., cement strength starts to decrease gradually. Calcium Silicate Hydrate (CSH) gel, which is formed by the hydration of cement and gives cement the strength, is stable up to 230° F. Above 230° F., CSH gel converts to alpha dicalcium silicate hydrate ($\alpha$-C2SH). See Gaurina-Medimurec, N., N., Matanović, D., & Krklec, G. (1994). Cement slurries for geothermal wells cementing. Rudarsko-Geološko-Naftni Zbornik, 6(1), 127-134, incorporated herein by reference in its entirety. $\alpha$-C2SH is crystalline and denser than CSH, which causes shrinkage in set cement, causing microcracks and thereby increasing permeability. The formation of $\alpha$-C2SH from CSH also causes the phenomenon of strength retrogression in HPHT wells. See Eilers, L. H. and Root, R. L. (1976). Long-Term Effects of High Temperature on Strength Retrogression of Cements. Presented at the SPE California Regional Meeting, long Beach, Calif., 7-9 April. SPE-5871-MS DOI: 10.2118/581-MS; and Jupe, A. C., Wilkinson, A. P., Luke, K., & Funkhouser, G. P. (2008). Class H cement hydration at 180° C. and high pressure in the presence of added silica. Cement and Concrete Research, 38(5), 660-666. DOI: 10.1016/j.cemconres.2007.12.004, each incorporated herein by reference in their entirety.

Nanotechnology is one of the most dynamic research areas rich with both innovative science and valuable applications. At nano-scale, the properties of an engineered nanomaterial are different from that of a macro-material having the same chemical composition. Nanomaterials have a larger surface area when compared to an equal mass of the same material in macro form. See Caskey, L. C., Carolina, N., Kolbash, C., & Carolina, N. (2015). Nanomaterials: The Good, the Bad, and the Ugly, (677), incorporated herein by reference in its entirety. Nanotechnology has provided a wide variety of solutions to resolve industrial problems, which could not be previously addressed by customary methods. It enables researchers to alter properties of bulk materials at the nanometer scale. Various nanomaterials have been successfully applied in many areas of petroleum engineering, especially in drilling fluids, loss circulation, enhanced oil recovery (EOR), and cementing.

Various types of nano silica have been reported to increase compressive strength, enhance early compressive strength, reduce permeability and porosity, improve fluid loss, reduce transition time from 100 lb/ft$^2$ to 500 lb/ft$^2$, and decrease density segregation. See Ershadi, V., Ebadi, T., Rabani, A., Ershadi, L., & Soltanian, H. (2011). The Effect of Nano silica on Cement Matrix Permeability in Oil Well to Decrease the Pollution of Receptive Environment. International Journal of Environmental Science and Development, 2(2), 128-132; Patil, R., & Deshpande, A. (2012). Use of Nanomaterials in Cementing Applications. Presented at SPE International Oilfield Nanotechnology Conference and Exhibition, Noordwijk, 12-14 June. SPE-155607-MS. DOI: 10.2118/155607-MS; and Rahman M. K., Amer S. A.., Al-Majed A. A., (2014). Portland Saudi Cement Type-G with Nano Silica Additive for High Pressure-High Temperature Applications. US Patent Application Publication, No. 2014-0332217; each incorporated herein by reference in their entirety. SEM images of cement mix with nanosilica confirmed nanofiller properties of nanosilica for denser microstructure. Pang et al. observed that the lower particle size and the higher aspect ratios resulted in increased cement hydration, which improved compressive strength. See Pang, X., Boul, P. J., & Jimenez, W. C. (2014). IADC/SPE 168037 Nano silica as Accelerators in Oilwell Cementing at Low Temperatures, (March), 4-6, incorporated herein by reference in its entirety. Carbon nanotubes have also been tested as an additive in oil well cementing to improve early compressive strength development, final compressive strength, and tensile strength with only a small concentration. See De Paula, J. N., Calixto, J. M., Ladeira, L. O., Ludvig, P., Souza, T. C. C., Rocha, J. M., & de Melo, E. A. A. V. (2014). Mechanical and rheological behavior of oilwell cement Slurries produced with clinker containing carbon Nanotubes. Journal of Petroleum Science and Engineering, 122, 274-279. DOI: 10.1016/j.petrol.2014.07.020; and Khan, W. A., Rahman, M. K., Mahmoud, M. A., & Sarmah, P. (2016). MWCNT for Enhancing Mechanical Properties of Oil Well Cement for HPHT Applications, each incorporated herein by reference in their entirety. Nanoclay has also been investigated as an admixture for oil well cementing at HPHT. See Murtaza, M., Rahman, M. K., & AI-Majed, A. A. (2016). Mechanical and Microstructural Studies of Nanoclay Based Oil Well Cement Mix under High Pressure and Temperature Application. International Petroleum Technology Conference. DOI: 10.2523/IPTC-18991-MS, incorporated herein by reference in its entirety. It was observed that nano clay not only accelerated the early strength development, but also increased the final strength along with a reduction in permeability and porosity of hardened cement. Smaller nanoclay size aided in filling the capillaries and resulted in dense microstructure.

Zeolite is an excellent supplementary cementitious material because of its high pozzolanic reactivity. See Ahmadi, B., & Shekarchi, M. (2010). Use of natural zeolite as a supplementary cementitious material. Cement and Concrete Composites, 32(2), 134-141. DOI: 10.1016/j.cemconcomp.2009.10.006, incorporated herein by reference in its entirety. Pozzolanic materials react with the calcium hydroxide produced during the hydration of ordinary Portland cement. See Massazza, F. (2003). Pozrolana and Pozzolanic Cements. Lea's Chemistry of Cement and Concrete, 15(1993), 471-635. DOI: 10.1016/B978-075066256-7/50022-9, incorporated herein by reference in its entirety. The term 'pozzolanic activity' refers to all reactions taking place between the pozzolans, lime, and water. Natural pozzolans react with lime, which results in the formation of calcium silicate hydrate (C—S—H), and calcium aluminate hydrates. Jana observed the reduction of calcium hydroxide produced in Portland cement with the addition of zeolite, which confirms the pozzolanic behavior of zeolite. See Jana, D. (2007). A new look to an old pozzolan: clinoptilolite—a promising pozzolan in concrete. Proceedings of the Twenty-Ninth Conference on Cement Microscopy, Quebec City, PQ, Canada, 20-24 May 2007, incorporated herein by reference in its entirety. Cannon investigated the effect of size and quantity of zeolite of various types as cement replacement material. It was observed that as the particle size of zeolite was reduced, compressive strength of the cement increased and free water reduced. See Cannon, J. (2013). Well Cement Containing Zeolite Minerals for HPHT Applications. DOI: 10.2118/134422, incorporated herein by reference in its entirety.

The present disclosure relates to a type of nanomaterial, referred to as nano zeolite, which improves the properties of cement in oil/gas wells subjected to HPHT conditions. A well located in Saudi Arabia was used to test a cement mix design. Nano zeolite material was added at various percentages to a Saudi Class G cement, and the beneficial impact of nano zeolite on the strength, rheological, and durability properties of the cement slurry was demonstrated.

In view of the foregoing, one objective of the present invention is to provide a method for making a cured cement material comprising zeolite particles as an additive for improved properties.

BRIEF SUMMARY OF THE INVENTION

According to a first aspect, the present disclosure relates to a method of making a cured cement material. The method involves the steps of mixing a hydraulic cement, water and/or brine, and zeolite nanoparticles to form a wet cement slurry. The water and/or brine is mixed in an amount of 40-50% by weight of the hydraulic cement and the zeolite nanoparticles are mixed in an amount of 0.5-4 wt % by weight of the hydraulic cement. The zeolite nanoparticles have an average diameter of 40-100 nm. The wet cement slurry is cured to produce the cured cement material, which comprises zeolite clusters having an average cluster diameter of 1-12 µm.

In one embodiment, the cured cement material further comprises pores, and a subset of the zeolite clusters is located within the pores.

In one embodiment, the hydraulic cement is selected from the group consisting of an API Class A Portland cement, an API Class G Portland cement, an API Class H Portland cement, and a Saudi Class G hydraulic cement.

In one embodiment, the zeolite nanoparticles have a silica to alumina mass ratio of 1.2:1-3.0:1.

In one embodiment, the zeolite nanoparticles comprise 1-6 wt % CaO relative to a total weight of the zeolite nanoparticles.

In one embodiment, the wet cement slurry reaches a compressive strength of 2,000 psi within a time of curing which is 0.8-3.0 h faster than an essentially identical wet cement slurry that was not formed with zeolite nanoparticles.

In one embodiment, the wet cement slurry is cured between a casing and a formation of a well bore.

In one embodiment, the wet cement slurry further comprises silica flour.

In a further embodiment, the wet cement slurry further comprises at least one additive selected from the group consisting of an expanding agent, a dispersant, a fluid loss control agent, a retarder, a defoamer, a density reducing additive, a density enhancing weighting agent, a foaming agent, and a friction reducing agent.

In a further embodiment, where the wet cement slurry further comprises silica flour and at least one additive, the cured cement material has a compressive strength of 5,500-6,800 psi.

In a further embodiment, where the wet cement slurry further comprises silica flour and at least one additive, the wet cement slurry reaches a compressive strength of 2,000 psi within a time of curing which is 1.5-3.5 h faster than an essentially identical wet cement slurry that was not formed with zeolite nanoparticles.

In one embodiment, the cured cement material has a weight of calcium silicate hydrate that is 20-70% lower than a second weight of calcium silicate hydrate of an essentially identical cured cement material made from a wet cement slurry that does not contain zeolite nanoparticles, relative to the second weight.

In one embodiment, the cured cement material has a weight of calcium hydroxide that is greater by a factor of 1.5-3.0 than a second weight of calcium hydroxide of an essentially identical cured cement material made from a wet cement slurry that does not contain zeolite nanoparticles.

According to a second embodiment, the present disclosure relates to a cured cement material comprising a cured hydraulic cement and zeolite clusters having an average cluster diameter of 1-12 µm. The zeolite clusters comprise zeolite particles having an average diameter of 400-600 nm.

In one embodiment, the cured cement material further comprises calcium silicate hydrate (CSH) at a weight percentage of 1-20 wt % relative to a total weight of the cured cement material.

In one embodiment, the cured cement material further comprises calcium hydroxide (CH) at a weight percentage of 35-55 wt % relative to a total weight of the cured cement material.

In one embodiment, the cured cement material further comprises calcium silicate at a weight percentage of 15-35 wt % relative to a total weight of the cured cement material.

In one embodiment, the cured cement material is located between a casing and a formation of a well bore.

In one embodiment, the cured cement material has pores, and the zeolite clusters are located within a subset of the pores.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
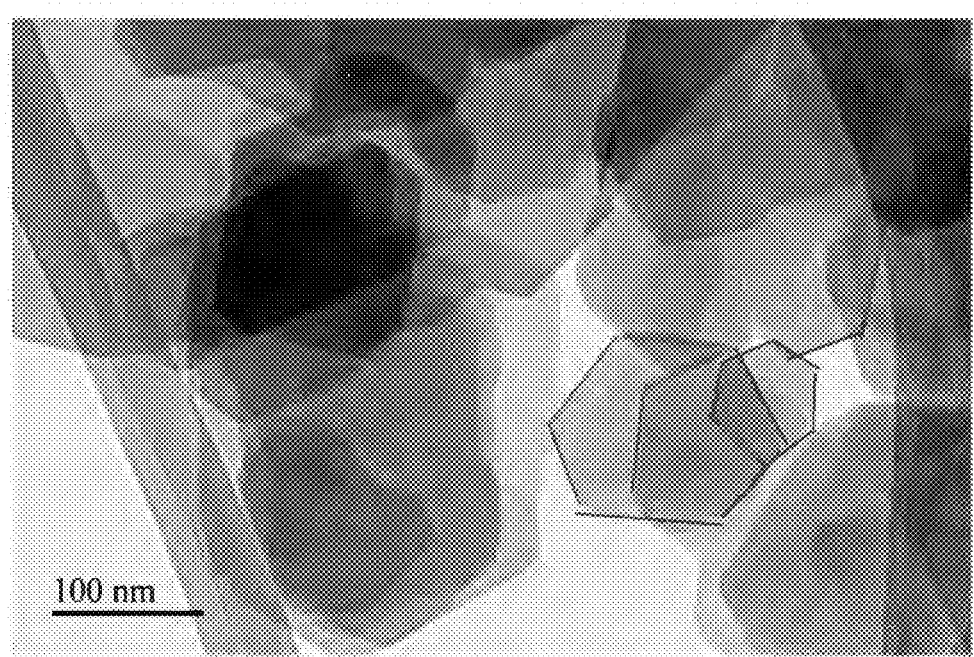
FIG. 1 is a TEM image of a nano zeolite.

Embodiments of the present disclosure will now be described more fully hereinafter with reference to the accompanying drawings, in which some, but not all embodiments of the disclosure are shown.

The present disclosure will be better understood with reference to the following definitions. As used herein, the words "a" and "an" and the like carry the meaning of "one or more." Within the description of this disclosure, where a numerical limit or range is stated, the endpoints are included unless stated otherwise.

As used herein, the words "about," "approximately," or "substantially similar" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), +/−15% of the stated value (or range of values), or +/−20% of the stated value (or range of values). Within the description of this disclosure, where a numerical limit or range is stated, the endpoints are included unless stated otherwise. Also, all values and subranges within a numerical limit or range are specifically included as if explicitly written out.

As used herein, "compound" is intended to refer to a chemical entity, whether as a solid, liquid, or gas, and whether in a crude mixture or isolated and purified.

As used herein, "composite" refers to a combination of two or more distinct constituent materials into one. The individual components, on an atomic level, remain separate and distinct within the finished structure. The materials may have different physical or chemical properties, that when combined, produce a material with characteristics different from the original components. In some embodiments, a composite may have at least two constituent materials that comprise the same empirical formula but are distinguished by different densities, crystal phases, or a lack of a crystal phase (i.e. an amorphous phase).

The present disclosure is intended to include all hydration states of a given compound or formula, unless otherwise noted or when heating a material. For example, aluminum sulfate, $Al_2(SO_4)_3$, includes anhydrous $Al_2(SO_4)_3$, $Al_2(SO_4)_3 \cdot 18H_2O$, and any other hydrated forms or mixtures.

In addition, the present disclosure is intended to include all isotopes of atoms occurring in the present compounds and complexes. Isotopes include those atoms having the same atomic number but different mass numbers. By way of general example, and without limitation, isotopes of hydrogen include deuterium and tritium. Isotopes of carbon include $^{13}C$ and $^{14}C$. Isotopes of nitrogen include $^{14}N$ and $^{15}N$. Isotopes of oxygen include $^{16}O$, $^{17}O$, and $^{18}O$. Isotopes of silicon include $^{28}Si$, $^{29}Si$, and $^{30}Si$. Isotopically-labeled compounds of the disclosure may generally be prepared by conventional techniques known to those skilled in the art or by processes analogous to those described herein, using an appropriate isotopically-labeled reagent in place of the non-labeled reagent otherwise employed.

According to a first aspect, the present disclosure relates to a method of making a cured cement material. The method involves the steps of mixing a hydraulic cement, water and/or brine, and zeolite nanoparticles to form a wet cement slurry.

As used herein, the term or phrase "cement" refers to a composition or substance with one or more constituents that is capable of binding materials together, once set. Generally, cement may include a number of dry constituents chosen based on the desired ratio or class of cement to be produced. Thus, cement refers to the dry, pre-set composition unless the context clearly dictates otherwise, for example, in a wet cement slurry, or in a cured cement material. In one embodiment, the cement may include hydraulic cement, non-hydraulic cement, or a combination thereof. In a preferred embodiment, the cement comprises Portland cement, a basic ingredient of concrete, mortar, stucco, and non-specialty grout, which is a fine powder, produced by heating limestone and clay minerals in a kiln to form clinker, grinding the clinker, and adding small amounts of other materials. Several types of Portland cement may be employed herein, for example, API Class A, Class G, or Class H; Ordinary Portland Cement (OPC) type I, type II, type III, type IV, or type V; or a combination thereof (in accordance with the ASTM C150 standard). Portland Cement type Ia, type IIa, and/or type IIIa may also be used, which have the same composition as types I, II, and III except that an air-entraining agent is ground into the mix (also in accord with the ASTM C150 standard).

Additional cement types include hydraulic cements, Saudi Class G hydraulic cement, non-hydraulic cements, Portland fly ash cement, Portland Pozzolan cement, Portland silica fume cement, masonry cements, mortars, EMC cements, stuccos, plastic cements, expansive cements, white blended cements, Pozzolan-lime cements, slag-lime cements, supersulfated cements, calcium aluminate cements, calcium sulfoaluminate cements, geopolymer cements, Rosendale cements, polymer cement mortar, lime mortar, and/or pozzolana mortar. In one embodiment, the cement comprises a cement blend of two or more types of cement, for example, a blend comprising Portland cement and non-Portland hydraulic cement. In a further embodiment, the cement is in the dry form. If needed to set, water is typically added after the cement is mixed with the other components/ingredients, for example, the date palm ash, and the coarse and fine aggregate, and it is then ready to be hardened or set. In one embodiment, the hydraulic cement is selected from the group consisting of an API Class A Portland cement, an API Class G Portland cement, an API Class H Portland cement, and a Saudi Class G hydraulic cement.

Typically, hydraulic cements, particularly Portland cements, are used to cement the well casing within the well bore. Hydraulic cements set and develop compressive strength due to the occurrence of a hydration reaction which allows them to set or cure under water. The physical properties of the set cement relate to the crystalline structure of the calcium-silicate-hydrates formed during hydration. For example, conventional Portland cements form an interlocking crystalline network of, for example, tricalcium silicate, dicalcium silicate, tetracalcium aluminum ferrite and calcium hydroxide crystals. These crystals interconnect to form an interlocking crystalline structure which provides both flexural strength and a degree of resiliency. Hydration products of Portland cements may also form crystalline or amorphous interlocking networks of the hydration products calcium silicate hydrate (CSH, or C—S—H), calcium hydroxide (CH, or Portlandite), calcium silicate (Lamnite), aluminum calcium iron oxide (such as $Ca_2FeAlO_5$), and/or silicon dioxide.

Cements suitable for use in a wet cement slurry include materials with hydraulic properties, such as hydraulic cement, slag and blends of hydraulic cement and slag (slagment), which are well known in the art. The term "hydraulic cement" refers to any inorganic cement that hardens or sets due to hydration. As used herein, the term "hydraulically-active" refers to properties of a cement material that allow the material to set in a manner like hydraulic cement, either with or without additional activation. Hydraulically-active cement materials may also have minor amounts of extenders such as bentonite, gilsonite, and cement materials used either without any appreciable sand or aggregate material or admixed with a granular filling material such as sand, ground limestone, the like. Strength enhancers such as silica powder or silica flour may also be employed. Hydraulic cements, for instance, include Portland cements, aluminous cements, pozzolan cements, fly ash cements, and the like. Thus, for example, any of the oil well type cements of the class "A-H" as listed in the API Spec 10, (1st ed., 1982), are suitable hydraulic cements. In addition, the cement material may include silica sand/flour and/or weighing agents including hematite or barite.

To form the wet cement slurry, the zeolite nanoparticles are mixed in an amount of 0.5-4 wt %, preferably 1.0-3.5 wt %, more preferably 1.5-3.2 wt %, even more preferably 1.8-2.5 wt % by weight of the hydraulic cement. However, in some embodiments, zeolite nanoparticles are mixed in an amount of less than 0.5 wt % or greater than 4.0 wt % by weight of the hydraulic cement. In an alternative embodiment, the wet cement slurry may be substantially free of zeolite nanoparticles, meaning that the wet cement slurry may comprise less than 0.001 wt %, preferably less than 0.0001 wt %, or about 0 wt % zeolite nanoparticles. In one embodiment, the zeolite nanoparticles may be referred to as "nano zeolite."

Zeolites are porous aluminosilicate minerals that may be found in nature or synthesized. Elementary building units of zeolites are $SiO_4$ and $AlO_4$ tetrahedra. Adjacent tetrahedra are linked at their corners via a common oxygen atom, which results in an inorganic macromolecule with a three-dimensional framework. The three-dimensional framework of a zeolite also comprises channels, channel intersections, and/or cages having dimensions in the range of 0.1-10 nm, preferably 0.2-5 nm, more preferably 0.2-2 nm. Water molecules may be present inside these channels, channel intersections, and/or cages.

In one embodiment, the zeolite nanoparticles may comprise one or more zeolites with a zeolite framework of, or similar to, amicite, ammonioleucite, analcime, barrerite, brewsterite, beilbergite, bikitaite, boggsite, chabazite, chiavennite, clinoptilolite, cowlesite, dachiardite, edingtonite, epistilbite, erionite, faujasite, ferrierite, garronite, gaultite, gismondine, gmelinite, gobbinsite, gonnardite, goosecreekite, gottardiite, harmotome, heulandite, hsianghualite, kalborsite, laumontite, leucite, lévyne, lovdarite, marciopaite, mazzite, merlinoite, mesolite, montesommaite, mordenite, mutinaite, nabesite, natrolite, offrietite, pahasapaite, paranatrolite, parthéite, paulingite, perlialite, phillipsite, pollucite, roggianite, scolecite, stellerite, stilbite, terranovaite, tetranatrolite, thomsonite, tschemichite, tschörtnerite, tvedalite, wairakite, weinebeneite, willhendersonite, yugawaralite, and combinations thereof. In another embodiment, the zeolite may have a zeolite framework similar to a synthetic crystalline aluminosilicate, such as zeolites having the trade-marked names of ZEOLITE A, ZEOLITE X, ZEOLITE Y, ZEOLITE K-G, ZEOLITE ZK5, ZEOLITE BETA, ZEOLITE ZK-4, SAPO, ALPO, USY, ZEOLITE ZSM-5 ("ZEOLITES SOCONY MOBIL-5" also called more simply, ZSM-5), ZSM-11, ZSM-12, ZSM-20, ZSM-23, ZSM-35, ZSM-38, ZSM-50, and combinations thereof. In an alternative embodiment, some other compositionally related material that is not a zeolite may be used in place of the zeolite nanoparticles, such as amorphous silica-alumina. In one embodiment, the zeolite nanoparticles may be considered as a pozzolan.

In one embodiment, the zeolite nanoparticles may comprise a zeolite having the formula $M_{a/n}[(AlO_2)_2(SiO_2)_b] \cdot xH_2O$, with M representing a metal such as Na, K, Li, Ag, Ca, Ba, Fe, or some other metal, and x representing the water molecules incorporated into the zeolite.

In one embodiment, the zeolite nanoparticles have a weight percentage of silica ($SiO_2$) of 50-70 wt %, preferably 55-65 wt %, more preferably 59-63 wt %, or about 61 wt %, relative to a total weight of the zeolite nanoparticles. However, in some embodiments, the zeolite nanoparticles may have a weight percentage of silica of less than 50 wt % or greater than 70 wt %.

In one embodiment, the zeolite nanoparticles may comprise alumina ($Al_2O_3$) at a weight percentage of 20-40 wt %, preferably 25-35 wt %, more preferably 28-32 wt %, or about 30 wt % relative to a total weight of the zeolite nanoparticles. However, in some embodiments, the zeolite nanoparticles may comprise alumina at a weight percentage smaller than 20 wt % or larger than 40 wt %.

In one embodiment, the zeolite nanoparticles have a silica ($SiO_2$) to alumina ($Al_2O_3$) mass ratio of 1.2:1-3.0:1, preferably 1.5:1-2.8:1, more preferably 1.8:1-2.5:1, or about 2.0:1. However, in some embodiments, the silica to alumina mass ratio may be lower than 1.2:1 or greater than 3.0:1.

In one embodiment, the zeolite nanoparticles may comprise iron(III) oxide ($Fe_2O_3$) at a weight percentage of 0.2-2.5 wt % o, preferably 0.5-1.8 wt %, more preferably 1.0-1.5 wt %, or about 1.2 wt % relative to a total weight of the zeolite nanoparticles. However, in some embodiments. the zeolite nanoparticles may comprise iron(III) oxide ($Fe_2O_3$) at a weight percentage smaller than 0.2 wt % or larger than 2.5 wt %. In other embodiments, the zeolite nanoparticles may comprise iron(II) oxide (FeO). In some embodiments, the zeolite nanoparticles may comprise substantially no Fe, for instance, less than 0.01 wt % Fe, preferably less than 0.001 wt % Fe, or about 0 wt % Fe, relative to a total weight of the zeolite nanoparticles.

In one embodiment, the zeolite nanoparticles comprise 1-6 wt % CaO, preferably 2-5 wt % CaO, more preferably 3-4.8 wt % CaO, relative to a total weight of the zeolite nanoparticles. However, in other embodiments, the zeolite nanoparticles may comprise less than 1 wt % CaO or greater than 6 wt % CaO, relative to a total weight of the zeolite nanoparticles. In some embodiments, the zeolite nanoparticles may comprise substantially no Ca, for instance, less than 0.01 wt % Ca, preferably less than 0.001 wt % Ca, or about 0 wt % Ca, relative to a total weight of the zeolite nanoparticles.

In one embodiment, the zeolite nanoparticles have an average diameter of 40-100 nm, preferably 45-80 nm, more preferably 60-75 nm, though in some embodiments, the zeolite nanoparticles may have an average diameter of less than 40 nm or greater than 100 nm. For instance, zeolite microparticles or millimeter-sized particles may be used. The zeolite nanoparticles may have a spherical shape, or may be shaped like cylinders, boxes, spikes, flakes, plates, ellipsoids, toroids, stars, ribbons, discs, rods, granules, prisms, cones, flakes, platelets, sheets, or some other shape.

In one embodiment, the zeolite nanoparticles may be substantially spherical, meaning that the distance from the particle centroid (center of mass) to anywhere on the nanoparticle outer surface varies by less than 30%, preferably by less than 20%, more preferably by less than 10% of the average distance.

In one embodiment, the zeolite nanoparticles are monodisperse, having a coefficient of variation or relative standard deviation, expressed as a percentage and defined as the ratio of the particle diameter standard deviation (c) to the particle diameter mean (p), multiplied by 100%, of less than 25%, preferably less than 10%, preferably less than 8%, preferably less than 6%, preferably less than 5%. In a preferred embodiment, the zeolite nanoparticles are to monodisperse having a particle diameter distribution ranging from 80% of the average particle diameter to 120% of the average particle diameter, preferably 85-115%, preferably 90-110% of the average particle diameter. In another embodiment, the zeolite nanoparticles are not monodisperse.

In one embodiment, the wet cement slurry comprises silica flour at a weight percentage of 25-45 wt %, preferably 30-40 wt %, preferably 32-37 wt %, or about 35 wt % relative to a total weight of the hydraulic cement. However, in some embodiments, the wet cement slurry may comprise less than 25 wt %, or greater than 45 wt % silica flour. The silica flour may comprise particles (or sand) of crystalline $SiO_2$, preferably α-quartz, having diameters of 1-300 μm, preferably 5-250 μm, more preferably 25-200 μm. Preferably the silica flour comprises greater than 95 wt % $SiO_2$, preferably greater than 98 wt % $SiO_2$, more preferably greater than 99 wt % $SiO_2$. In other embodiments, silica flour may be referred to as silica sand, silica powder, or quartz sand. In an alternative embodiment, the wet cement slurry may comprise silica in a different form, including but not limited to fumed silica, amorphous silica, and β-quartz. In another alternative embodiment, the wet cement slurry may comprise desert sand or some other naturally occurring sand in place of the silica flour.

In one embodiment, the wet cement slurry does not comprise cement kiln dust, vitrified shale, and/or amorphous silica. In another embodiment, the wet cement slurry does not comprise nanoclay. As defined here, nanoclays are nanoparticles of layered mineral silicates, and may belong to classes such as montmorillonite, bentonite, kaolinite, hectorite, and halloysite. In a further embodiment, the wet cement slurry does not comprise any layered mineral silicates as nanoparticles or in other forms.

In one embodiment, the wet cement slurry comprises at least one additive selected from the group consisting of an expanding agent, a dispersant, a fluid loss control agent, a retarder, a defoamer, a density reducing additive, a density enhancing weighting agent, a foaming agent, a friction reducing agent, a suspending agent, a viscosifier, and a plasticizer. The amount of additive typically is dependent on the type of hydraulic cement used and desired density of the wet cement slurry. One or more additives may be present in the cement at a weight percentage of 0.1-3.0 wt %, preferably 0.2-2.5 wt %, more preferably 0.5-1.8 wt % by weight of the hydraulic cement. However, in some embodiments, less than 0.1 wt % or greater than 3.0 wt % of cement additive by weight of the hydraulic cement, may be present.

Examples of retarders are lignin and sugar derivatives. Deflocculents or dispersants to control fluidity include ligno-sulfonates, naphthalene sulfonates, phenol sulfonates, phosphates, phosphonates, sulfonated styrene maleic anhydride, sulfonated styrene, maleimide, polyacrylates and polymethacrylates. Viscosity reducers include organic acids.

The wet cement slurry of the invention may further contain a suspending agent for maintaining the slurry with minimal separation of the slurry components. Certain types of suspending agents of the type used in the drilling mud industry may be used for the purposes of the present invention. Suitable suspending/thixotropic agents include welan gum, xanthan gum, cellulose, polyanionic cellulose, xanthan gums, cellulose and derivatives such as carboxymethyl-hydroxyethyl-cellulose, guar and its derivatives, starch and polysaccharides, succinoglycan, polyethylene oxide, bentonite, attapulgite, mixed metal hydroxides, clays such as bentonite and attapulgite, mixed metal hydroxides, oil in water emulsions created with paraffin oil and stabilized with ethoxylated surfactants, poly (methyl vinyl ether/maleic anhydride) decadiene copolymer, etc. Preferred suspending agents include iota carrageenan and poly (methyl vinyl ether/maleic anhydride) decadiene copolymer.

In one embodiment, water and/or brine may be mixed in the wet cement slurry in an amount of 40-50% by weight of the hydraulic cement, preferably 41-48% by weight of the hydraulic cement, more preferably 42-47% by weight of the hydraulic cement, even more preferably 43-46% by weight of the hydraulic cement. In general, the amount of water and/or brine used in forming the wet cement slurry depends upon the type of hydraulic cement selected and the job conditions at hand. Thus, in other embodiments, the water and/or brine may be mixed in the wet cement slurry in an amount of less than 40% or greater than 50% by weight of the hydraulic cement. The amount of water used may vary over a wide range, depending upon such factors as the required consistency of the wet cement slurry and upon the strength requirement for a particular well bore. In one embodiment, the water and/or brine may comprise the above-mentioned additives before being added to the dry ingredients of the cement mixture.

The water and/or brine may be seawater or freshwater, and may be taken from a natural source, such as an aquifer, lake, or ocean, and may be filtered to remove large solids before being mixed. A brine is an aqueous mixture of one or more soluble salts, such as sodium chloride, potassium chloride, calcium chloride, calcium bromide, sodium bromide, potassium bromide, or zinc bromide, and has at least 30 g soluble salts per L solution. Sea water or water from a salt lake may be considered a brine, or a brine may be formed by mixing water or freshwater with soluble salts or a solution comprising soluble salts.

In one embodiment the wet cement slurry may comprise only water, cement, and zeolite nanoparticles. For instance, the wet cement slurry may comprise an amount of cement, and 38-50 wt % water, preferably 46-48 wt % water; and 0.5-3.0 wt % zeolite nanoparticles, preferably 1.5-2.5 wt % zeolite nanoparticles, where each weight percentage is relative to a total weight of the cement.

In another embodiment, the wet cement slurry may comprise cement, water, silica flour, expanding agent, dispersant, a first fluid loss control agent, a second fluid loss control agent, a retarder, and the zeolite nanoparticles. For instance, this wet cement slurry may comprise an amount of cement; 38-50 wt %, preferably 42-48 wt % water; 20-40 wt %/o, preferably 30-38 wt % silica flour; 0.1-3.0 wt %, preferably 0.8-1.2 wt % expanding agent; 0.1-3.0 wt %, preferably 0.8-1.2 wt % dispersant; 0.05-0.50 wt %, preferably 0.10-0.30 wt % of a first fluid loss control agent; 0.1-0.8 wt %, preferably 0.2-0.7 wt % of a second fluid loss control agent; 0.3-1.0 wt %, preferably 0.5-0.8 wt % retarder; and 0.5-3.5 wt % zeolite nanoparticles, preferably 1.5-2.5 wt % zeolite nanoparticles, where each weight percentage is relative to a total weight of the cement.

The wet cement slurry may have a density of 14.0-18.0 lb/gal, preferably 15.0-17.0 lb/gal, more preferably 15.8-16.9 lb/gal.

After the wet cement slurry is formed, the wet cement slurry is cured to produce the cured cement material. In one embodiment, the wet cement slurry is cured between a casing and a formation of a well bore, thus producing a cured cement material between the casing the formation of the well bore. The wet cement slurry may be cured at a temperature similar to that within a well bore, such as 150-350° F., preferably 180-320° F., more preferably 190-290° F., even more preferably 220-260° F. However, in some embodiments, the wet cement slurry may be cured at a temperature of less than 150° F. or greater than 350° F. In one embodiment, the wet cement slurry may be cured around room temperature, for instance, 68-78° F.

In one embodiment, the wet cement slurry may be cured at a pressure of 5,000-10,000 psi, preferably 6,000-9,000 psi, more preferably 7,000-8,500 psi. However, in some embodiments, the wet cement slurry may be cured at atmospheric pressure, or may be cured at pressures lower than 5,000 psi or greater than 10,000 psi.

In one embodiment, the wet cement slurry may be cured following the addition of an activator. Activators and activation methods as described in U.S. Pat. Nos. 5,447,197 and 5,547,506 may be employed, including "over-activation." Activators are typically added just prior to use of a storable cement slurry. Typical activators include, but are not limited to, solutions of Group IA and IIA hydroxides and carbonates, such as sodium hydroxide (caustic), potassium hydroxide, magnesium hydroxide, calcium hydroxide, sodium carbonate and calcium carbonate; Group IA halides, such as sodium fluoride and KF; ammonium halides, such as ammonium fluoride and ammonium bifluoride (ABF); sulfates, such as sodium sulfate; aluminates, such as sodium aluminate and potassium aluminate; carbonates, such as alkali carbonates, like sodium carbonate; phosphates, such as dibasic alkali phosphates (like dibasic potassium phosphate) and tribasic alkali phosphates (like tribasic potassium phosphate); ammonium phosphates, such as tribasic ammonium phosphate and dibasic ammonium phosphate; silicates; and amines (such as triethanolamine ("TEA"), diethanolamine, etc. Most typical activators are alkali silicates, such as sodium silicates. For slag slurries a sodium silicate "Crystal 120H," Crosfield, Warrington, England, with a particular silica/soda ratio is especially preferred. Sodium silicate ("Crystal 100S", Crosfield) with a different silica/soda ratio is especially preferred for hydraulic cement and slagment slurries. In one embodiment, an activator is added just prior to pumping the cement into a well bore to form a cured cement between a formation and a casing. A cured cement located between a formation and a casing may be considered as a cement sheath.

In one embodiment, a wet cement slurry may have a plastic viscosity of 60-120 cp, preferably 75-110 cp, more preferably 80-105 cp, or about 100 cp. However, in some embodiments, the wet cement slurry may have a plastic viscosity of less than 60 cp or greater than 120 cp. In one embodiment, increasing a concentration of zeolite nanoparticles in the wet cement slurry may increase the plastic viscosity, for instance, from about 70 cp to about 100 cp.

In one embodiment, a wet cement slurry further comprising silica flour and at least one additive may have a plastic viscosity of 230-300 cp, preferably 250-290 cp, more preferably 265-280 cp, or about 275 cp. However, in some embodiments, the wet cement slurry may have a plastic viscosity of less than 230 cp or greater than 300 cp. In one embodiment, increasing a concentration of zeolite nanoparticles in the wet cement slurry may increase the plastic viscosity.

In one embodiment, a wet cement slurry may have a yield point of 15-30 lb/100 ft$^2$, preferably 20-28 lb/100 ft$^2$, more preferably 22-27 lb/100 ft$^2$, or about 25 lb/100 ft$^2$. In one embodiment, increasing a concentration of zeolite nanoparticles in the wet cement slurry may increase the yield point, for instance, from about 20 lb/100 ft$^2$ to about 25 lb/100 ft$^2$.

In one embodiment, a wet cement slurry further comprising silica flour and at least one additive may have a yield point of 3-9 lb/100 ft$^2$, preferably 3.5-8 lb/100 ft$^2$, or about 4 lb/100 ft$^2$, or about 7 lb/100 ft$^2$. In one embodiment, increasing a concentration of zeolite nanoparticles in the wet cement slurry may increase the yield point.

In one embodiment, a wet cement slurry may have a 10-sec gel strength of 15-25 lb/100 ft$^2$, preferably 16-23 lb/100 ft$^2$, or about 21 lb/100 ft$^2$. In one embodiment, increasing a concentration of zeolite nanoparticles in the wet cement slurry may increase the 10-sec gel strength, for instance, from about 16 lb/100 ft$^2$ to about 21 lb/100 ft$^2$.

In one embodiment, a wet cement slurry further comprising silica flour and at least one additive may have a 10-sec gel strength of 4-9 lb/100 ft$^2$, or 6-7 lb/100 ft$^2$. In one embodiment, increasing a concentration of zeolite nanoparticles in the wet cement slurry may increase the 10-sec gel strength, for instance, from about 6 lb/100 ft$^2$ to about 7 lb/100 ft$^2$.

In one embodiment, a wet cement slurry may have a 10-min gel strength of 50-100 lb/100 ft$^2$, preferably 70-95 lb/100 ft$^2$, more preferably 80-90 lb/100 ft$^2$, or about 88 lb/100 ft$^2$. In one embodiment, increasing a concentration of zeolite nanoparticles in the wet cement slurry may increase the 10-min gel strength, for instance, from about 50 lb/100 ft$^2$ to about 90 lb/100 ft$^2$.

In one embodiment, a wet cement slurry further comprising silica flour and at least one additive may have a 10-min gel strength of 15-30 lb/100 ft$^2$, preferably 20-29 lb/100 ft$^2$, more preferably 22-28 lb/100 ft$^2$, or about 25 lb/100 ft$^2$. In one embodiment, increasing a concentration of zeolite nanoparticles in the wet cement slurry may increase the 10-min gel strength, for instance, from about 20 lb/100 ft$^2$ to about 25 lb/100 ft$^2$.

The wet cement slurry may be left to cure for a length of time necessary to achieve a desired mechanical property, such as a desired mechanical strength or tensile strength. Preferably the wet cement slurry, left to cure, will harden with a strength (such as compressive or tensile strength) that increases over the curing time. However, a strength will increase to a maximum value within a certain time of curing, for example, within 28 days or within 7 days. In one embodiment, the wet cement slurry may be left to cure for 5 h-30 days, preferably 12 h-14 days, more preferably 24 h-7 days, though in some embodiments, the wet cement slurry may be considered cured in less than 5 h or after 30 days.

In one embodiment, the cured cement material comprises zeolite clusters having an average cluster diameter of 1-12 µm, preferably 3-10 µm, more preferably 4-8 µm. However, in some embodiments, the cured cement material may comprise zeolite clusters having an average cluster diameter of less than 1 µm or greater than 12 µm. In an alternative embodiment, the cured cement material may comprise dispersed zeolite particles that are not clustered.

In one embodiment, the zeolite clusters may be considered agglomerates of zeolites. As used herein, the term "agglomerates" refers to a clustered particulate composition comprising primary particles, the primary particles being aggregated together in such a way so as to form clusters thereof, at least 50 volume percent of the clusters having a mean diameter that is at least 2 times the mean diameter of the primary particles, and preferably at least 90 volume percent of the clusters having a mean diameter that is at least 5 times the mean diameter of the primary particles. The primary particles may be the zeolite nanoparticles having a mean diameter as previously described.

In a related embodiment, the zeolite may react with calcium hydroxide in the cement, producing calcium silicate hydrate and calcium aluminate hydrate in the cured cement material. In the embodiments where the zeolite reacts, the unreacted zeolite may be present as zeolite clusters and may occupy pores of the cured cement material.

In one embodiment, the cured cement material further comprises pores, and a subset of the zeolite clusters is located within the pores. The cured cement material may comprise pores having an average diameter of 1-12 µm, preferably 3-10 µm, more preferably 4-8 µm, though some cured cement materials may have pores with an average pore diameter of less than 1 µm or greater than 12 µm. In one embodiment, the cured cement material may have a hierarchical porosity, meaning that smaller pores are connected with larger pores. In one embodiment, the cured cement material may have a porosity of 18-24%, preferably 20-23%, and a permeability of 0.0001-0.0010 md, preferably 0.0004-0.0006 md. In one embodiment, the addition of zeolite nanoparticles to a wet cement slurry decreases the porosity and permeability of a resulting cured cement material. In some cases, this decrease in porosity and permeability may be due to zeolite filling in the pores.

As mentioned previously, a subset of the zeolite clusters may be located within pores. For instance, 20-90%, preferably 30-80% of the zeolite clusters, relative to a total number of zeolite clusters, may be located within pores. In other embodiments, less than 20% or greater than 90% of the zeolite clusters may be located in pores. In one embodiment, all of the zeolite clusters may be located within the pores.

In one embodiment, a cured cement material made with zeolite nanoparticles, or with a higher concentration of zeolite nanoparticles, may have a lower occurrence of micro cracks. The lower occurrence of micro cracks may be the result of a denser structure.

A cured cement material may comprise high density CSH having a C/S (i.e. calcium oxide to silica) ratio of 3.3-3.7, preferably 3.4-3.6, or about 3.5. This dense CSH may be called an "inner product" and may comprise CSH in a flat, nanosheet, nanoflake, nanoplatelet, planar, or lamellar morphology. A cured cement material may comprise low density CSH having a C/S ratio of 3.1-3.3, preferably 3.15-3.28, or about 3.25. This low density CSH may be called an "outer product" and may comprise CSH in a needle, spike. In one embodiment, zeolite clusters may be located within pores of high density CSH. In this embodiment, the zeolite nanoparticles may have reacted with the calcium hydroxide in the cement to produce high density CSH. In another embodiment, zeolite clusters may be located within pores of low density CSH. In this embodiment, the zeolite nanoparticles may have reacted with the calcium hydroxide in the cement to produce low density CSH. In a preferred embodiment, the zeolite nanoparticles may react and produce both low density and high density CSH in a single cured cement material. In one embodiment, CSH may exist in other morphologies, such as a flower-like structure, which may be associated with a C/S ratio of 2.8-3.1, preferably 2.85-3.05, or about 3.0. In another embodiment, CSH may have a rod-like morphology rich in sulfur and aluminum, suggesting a type of mineral such as Ettringite or Monosulfate.

In one embodiment, the presence of the zeolite nanoparticles makes the wet cement slurry reach a certain compressive strength in a curing time faster than a wet cement slurry that does not comprise zeolite. For instance, in one embodiment, the wet cement slurry may reach a compressive strength of 2,000 psi within a time of curing which is 0.8-3.0 h, preferably 1.0-2.5 h, more preferably 1.3-2.2 h faster than an essentially identical wet cement slurry that was not formed with zeolite nanoparticles. Here, in one embodiment, the wet cement slurry may reach a compressive strength of 2000 psi in a curing time of 5.5-8.8 h, preferably 6.0-8.2 h, more preferably 6.2-7.5 h.

In a related embodiment, where the wet cement slurry comprises silica flour and at least one additive, the wet cement slurry may reach a compressive strength of 2,000 psi within a time of curing which is 1.5-3.5 h faster, preferably 1.8-3.2 h faster, more preferably 2.2-2.8 h faster than an essentially identical wet cement slurry that was not formed with zeolite nanoparticles. Here, in one embodiment, this wet cement slurry may reach a compressive strength of 2000 psi in a curing time of 6.0-9.0 h, preferably 6.5-8.5 h, more preferably 7.2-7.8 h.

In a further embodiment, where the wet cement slurry comprises silica flour and at least one additive, the cured cement material has a compressive strength of 5,500-6,800 psi, preferably 5,800-6,600 psi, more preferably 5,900-6,500 psi, or about 5,900 psi, or about 6400 psi. This compressive strength may be the "unconfined compressive strength," which is the maximum load per unit surface area a cement specimen may take before failing in a compression test with no confining pressure. In some embodiments, the compressive strength may be higher than 6,800 psi. In this embodiment, an essentially identical cured cement material made from a wet cement slurry that does not comprise zeolite may have a compressive strength of 4,500-5,500 psi, preferably 4,600-5,200 psi, or about 5,000 psi.

In one embodiment, where the wet cement slurry comprises silica flour and at least one additive, the cured cement material may have a Young's modulus that increases as the weight percentage of zeolite nanoparticle in the wet cement slurry increases. In this embodiment, a wet cement slurry with 0.5-1.5 wt % nanozeolite by weight of cement may form a cured cement material having a Young's modulus of 1,200-1,800 MPa, or about 1,600 MPa. A wet cement slurry with 1.5-2.5 wt % nanozeolite by weight of cement may form a cured cement material having a Young's modulus of 1,800-2,300 MPa, or about 2,180 MPa. A wet cement slurry with 2.5-3.5 wt % nanozeolite by weight of cement may form a cured cement material having a Young's modulus of 2,300-2,700 MPa, or about 2,500 MPa.

In one embodiment, the cured cement material may have a tensile strength of 1,000-1,500 psi, preferably 1,100-1,450 psi, more preferably 1,300-1,440 psi, or about 1400 psi. However, in some embodiments, the cured cement material may have a tensile strength of less than 1,000 psi or greater than 1,500 psi.

In one embodiment, the cured cement material comprises hydration products, such as calcium silicate hydrate (CSH, or C—S—H), calcium hydroxide (CH, or Portlandite), calcium silicate (for example, Larnite), aluminum calcium iron oxide (such as $Ca_2FeAlO_5$), and/or silicon oxide (such as silicon dioxide, or quartz). In one embodiment, the addition of zeolite nanoparticles and/or other additives may change the composition of hydration products in the resulting cured cement. In an alternative embodiment, the addition of zeolite nanoparticles and/or other additives, for example, of certain types or of small amounts, may not change the composition of hydration products in the resulting cured cement.

In one embodiment, the cured cement material comprises calcium silicate hydrate (CSH) at a weight percentage of 1-20 wt %, preferably 5-18 wt %, more preferably 8-17 wt %, or about 15 wt %, relative to a total weight of the cured cement material. In another embodiment, the cured cement material comprises calcium silicate hydrate (CSH) at a weight percentage of 20-55 wt %, preferably 30-52 wt %, more preferably 40-48 wt % or about 46 wt %, relative to a total weight of the cured cement material. In other embodiments, however, the cured cement material may comprise calcium silicate hydrate at a weight percentage of less than 1 wt %, or greater than 55 wt %, relative to a total weight of the cured cement material.

In one embodiment, the cured cement material has a weight of calcium silicate hydrate (CSH) that is 20-70% lower, preferably 30-60% lower, more preferably 35-55% lower than a second weight of calcium silicate hydrate of an essentially identical cured cement material made from a wet cement slurry that does not contain zeolite nanoparticles, relative to the second weight. For example, in one embodiment, the cured cement material may comprise 5-30 wt %, preferably 10-25 wt % CSH relative to a total weight of the cured cement material while an essentially identical cured cement material not made with a zeolite may comprise CSH at a weight percentage of 35-55 wt %, preferably 40-45 wt % relative to a total weight of the essentially identical cured cement material.

In one embodiment, the cured cement material comprises calcium hydroxide (CH) at a weight percentage of 35-55 wt %, preferably 38-51 wt %, more preferably 42-48 wt %, or about 46 wt %, relative to a total weight of the cured cement material. In another embodiment, the cured cement material comprises calcium hydroxide at a weight percentage of 8-35 wt %, preferably 14-32 wt %, more preferably 20-30 wt %, or about 28 wt %, relative to a total weight of the cured cement material. In other embodiments, however, the cured cement material may comprise calcium hydroxide at a weight percentage of less than 8 wt %, or greater than 55 wt %, relative to a total weight of the cured cement material.

In one embodiment, the cured cement material has a weight of calcium hydroxide (CH, or Portlandite) that is greater by a factor of 1.5-3.0 than a second weight of calcium hydroxide of an essentially identical cured cement material made from a wet cement slurry that does not contain zeolite nanoparticles. For example, in one embodiment, the cured cement material may comprise 24-55 wt %, preferably 40-45 wt % CH relative to a total weight of the cured cement material while an essentially identical cured cement material not made with a zeolite may comprise CH at a weight percentage of 8-25 wt %, preferably 15-23 wt % relative to a total weight of the essentially identical cured cement material.

In one embodiment, the cured cement material comprises calcium silicate at a weight percentage of 15-35 wt %, preferably 18-30 wt %, more preferably 20-28 wt %, or about 24 wt %, relative to a total weight of the cured cement material. In another embodiment, the cured cement material comprises calcium silicate at a weight percentage of 3-15 wt %, preferably 4-12 wt %, more preferably 5-9 wt %, or about 7 wt %, relative to a total weight of the cured cement material. In other embodiments, however, the cured cement material may comprise calcium silicate at a weight percentage of less than 3 wt %, or greater than 35 wt %, relative to a total weight of the cured cement material.

In one embodiment, the cured cement material comprises aluminum calcium iron oxide at a weight percentage of 5-11 wt %, preferably 6-10.5 wt %, more preferably 8-10.2 wt %, or about 10 wt %, relative to a total weight of the cured cement material. In another embodiment, the cured cement material comprises aluminum calcium iron oxide at a weight percentage of 11-20 wt %, preferably 12-19 wt %, more preferably 14-18 wt %, or about 16 wt %, relative to a total weight of the cured cement material. In other embodiments, however, the cured cement material may comprise aluminum calcium iron oxide at a weight percentage of less than 5 wt %, or greater than 20 wt %, relative to a total weight of the cured cement material.

In one embodiment, the cured cement material comprises silicon dioxide at a weight percentage of 2-10 wt %, preferably 3-8 wt %, more preferably 4-7 wt %, or about 5 wt %, relative to a total weight of the cured cement material. In other embodiments, however, the cured cement material may comprise silicon dioxide at a weight percentage of less than 2 wt % (such as 0 wt %, or no silicon dioxide), or greater than 10 wt %, relative to a total weight of the cured cement material.

According to a second embodiment, the present disclosure relates to a cured cement material as described above, including in the first aspect of the present disclosure. In one embodiment, the cured cement material may be made by one of the processes described by the present disclosure. In another embodiment, the cured cement material may be made by a different process, either modified or completely different than the processes described above. The cured cement material may have mechanical and microstructure properties that are similar or different.

The examples below are intended to further illustrate protocols for preparing, characterizing the cured cement material, and uses thereof, and are not intended to limit the scope of the claims.

Example 1

Procedures

The present invention relates to an oil and gas well cementing operation, more specifically, to wells under high temperature high pressure conditions, using a cement slurry composition in which nano zeolite is used as an additive. The nano zeolite based cement slurry may be used for primary cementing and other well completion and remedial operations.

The present invention includes a slurry composition, comprising hydraulic cement, water, and nano zeolite. The cement of the composition is optionally admixed with at least one additive selected from the group consisting of silica flour, fluid loss control additives, retarder, expanding agent, density reducing additives, density enhancing weighting agents, friction reducing agent, defoaming agents, and combinations thereof, for application in oil and gas well cementing under high temperature and pressure conditions (HTPT). Thus, the cement slurry composition may comprise class G cement powder, nano zeolite, silica flour, expanding agent, dispersant, fluid loss control agent, retarder, and defoamer. The slurry composition yields superior cement slurry properties, which include thickening time, free water content, rheological properties, compressive strength, tensile strength, density, porosity and permeability.

Zeolite mineral according to Coombs et al. is a crystalline substance with a structure characterized by a framework of linked tetrahedra, each consisting of four O atoms surrounding a cation. See Coombs, D. S., Alberti, A., Armbruster, T., Artioli, G., Colella, C., Galli, E., Vezzalini, G. (1997). Recommended nomenclature for zeolite minerals: report of the subcommittee on zeolites of the International Mineralogical Association, Commission on new Minerals and Mineral names. Canadian Mineralogist, 35(6), 1571-1606. doi: 10.1180/minmag.1997.061.405.13—incorporated herein by reference in its entirety. This framework contains open channels and cages. These are usually occupied by $H_2O$ molecules and extra framework cations that are commonly exchangeable. The channels are large enough to allow the passage of other molecules.

Natural zeolite has a three-dimensional frame structure and is classified as a hydrated aluminosilicate of alkali and alkaline earth cations. Zeolite crystals are characterized by a honeycomb-like structure with extremely small pores and channels, varying in size from $3 \times 10^{-4}$-$4 \times 10^{-4}$ μm. Zeolites may be either natural or man-made and there are more than 50 natural and 150 synthetic zeolite minerals known and used in various industries. See Ahmadi, B. and Shekarchi, M. (2010). Use of natural zeolite as a supplementary cementitious material. Cement and Concrete Composites, 32 (2), 134-141, doi: 10.1016/j.cemconcomp.2009.10.006—incorporated herein by reference in its entirety.

Natural zeolites are crystalline aluminosilicate minerals having similar chemical composition to clay minerals, but they have a three-dimensional structured framework in contrast to the flat layered structure of clay minerals. See KtUilkyildmm, E., and B. Uzal. 2014. "Characteristics of Calcined Natural Zeolites for Use in High-Performance Pozzolan Blended Cements," Construction and Building Materials 73: 229-34, doi: 10.1016/j.conbuildmat.2014.09.081—incorporated herein by reference in its entirety. Natural zeolites are excellent pozzolanic materials. Their higher external surface area and metastability is believed to be the cause of their reactivity, which complements the formation of calcium silicate and aluminate hydrates (CSH and CAH) after the reaction with calcium hydroxide. See Caputo, D., Liguori, B., & Colella, C. (2008). Some advances in understanding the pozzolanic activity of zeolites: The effect of zeolite structure. Cement and Concrete Composites, 30(5), 455-462, doi: 10.1016/j.cemconcomp.2007.08.004-incorporated herein by reference in its entirety.

Natural zeolites such as Clinoptilolite and Chabazite have applications in various diversified fields including the cement and concrete industry. However, natural zeolites are contaminated by other minerals, and hence they may not be suitable for several important commercial applications where uniformity and purity are essential. Synthetic zeolites are synthesized by chemical processes, which result in a more uniform and purer state as compared to the natural types in terms of their lattice structures, and sizes of pores and cages in their frameworks. See Jha and D. N. Singh, Fly Ash Zeolites, Advanced Structured Materials 78, doi: 10.1007/978-981-10-1404-8_2—incorporated herein by reference in its entirety. Synthetic zeolites are created with similar structure as the natural zeolites and are composed of alumino-silicate hydrates possessing the basic formula:

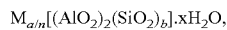

$M_{a/n}[(AlO_2)_2(SiO_2)_b] \cdot xH_2O$, where M represents cations (like Na, K, Li, Ag, Ca, Ba etc.); n represents the cation valence; and x represents the moles of water incorporated into the zeolite structure. See Luke K., Reddy R., Fitzgerald R. M., et al. (2004). Zeolite containing cement composition. US Patent Application Publication, No. 2004-0112600—incorporated herein by reference in its entirety.

Nano zeolite refers to nanoparticles of zeolite synthesized with same structure as zeolites. Properties of zeolite materials are significantly changed as particle size is decreased to nanometer scales, which results in improved performance as compared to their micron scale counterparts. Nanoparticles of zeolite have high surface area, which results in higher surface activity. See Tosheva Lubomira, and Valentin P. Valtchev. 2005. "Nanozeolites: Synthesis, Crystallization Mechanism, and Applications." Chemistry of Materials. doi:10.1021/cm047908z—incorporated herein by reference in its entirety.

The term "nano zeolite" refers to particles of zeolite in which the particle size is less than 1000 nm. In another embodiment, particle size is less than 100 nm. More specifically, in another embodiment, the size is in the range 30-80 nm, and the silica/alumina ratio may be about 2:1.

The nano zeolite used in this invention is procured from Nanoshel LLC, USA and it may be available commercially from other sources. The nano zeolite used in the current invention has an average particle size of less than 80 nm. XRF analysis was performed to confirm the chemical composition of nano zeolite used in this embodiment, which is presented in Table 1.

TABLE 1

| XRF analysis of nano zeolite used in this invention | | | | | |
|---|---|---|---|---|---|
| Compound | $SiO_2$ | $Al_2O_3$ | $Fe_2O_3$ | CaO | Total |
| Concentration | 61.30% | 30.33% | 1.24% | 4.27% | 97.14% |

Figure 2:
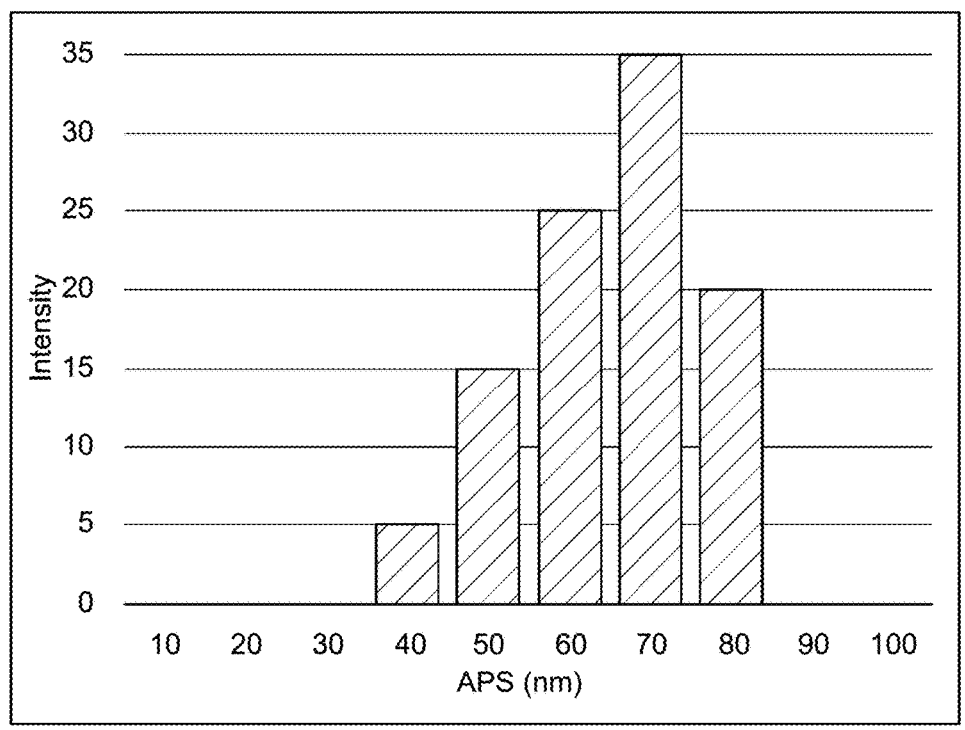
FIG. 2 is a particle size distribution of a nano zeolite.

A TEM image analysis of the nano zeolite particles used in this study is shown in FIG. 1. Here, the TEM image shows hexagonal sheet-like particles of nano zeolite in a size range less than 100 nm. Agglomeration of particles may be observed due to the strong attractive forces in nanoparticles. Particle size distribution for nano zeolite as provided by the supplier is presented in FIG. 2. All the particles have a particle size less than 100 nm, and preferably less than 80 nm.

The cement slurry in the embodiment may use fresh water or salt water in sufficient quantity to produce a cement mix which may be easily pumped to depths as far as 10,000 meters. The water to cement ratio may range from about 0.5 to 0.7. In certain embodiments, it may range from 0.4 to 0.5 by weight of cement.

For HPHT cementing, the cement composition in the present invention may have a host of different additives to impart properties to the cement slurry to ensure its pumpability, durability, and long-term integrity. The additives may include weighting agents to impart high density required for balancing the formation pressure; silica flour or other appropriate additives to ensure that long-term strength retrogression of the cement mix is precluded under HPHT conditions; retarders, accelerators, or friction reducing agents to ensure that the slurry remains pumpable without extensive wait on cement time; fluid loss additives to ensure exclusion of gas migration and zonal isolation throughout the life of the well; and dispersants to ensure the slurry stability.

The slurries are tested per the recommended practice for testing well cements unless specified otherwise. See API RP 10B-2, Recommended Practice for Testing Well Cements. 2013. Washington, D.C.: API, incorporated herein by reference in its entirety. API Specifications 10B-2 outlines the recommended practices for slurry preparation, conditioning, and testing various properties of oil-well cement. Following API specifications makes sure that the results obtained are reproducible in the tested conditions.

A cement design of typical well in Saudi Arabia was selected to test the behavior of nano zeolite on cement design performance. The specifications of selected well are presented in Table 2, and the temperature and pressure conditions at which slurry properties are assessed are based on the selected well specifications.

TABLE 2

Specifications of selected well

| Well Parameters | Values |
| --- | --- |
| Depth of well (TVD) | 14000 ft. |
| Bottom Hole Circulating Temperature (BHCT) | 228° F. |
| Bottom Hole Static Temperature (BHST) | 290° F. |
| Time to reach bottom | 49 min |
| Mud Weight (MW) | 11.4 ppg |
| Bottom Hole Pressure (BHP) | 8300 psi |
| Surface pump pressure | 1050 psi |

Cement Slurry Preparation

The cement slurries were prepared using a variable speed high-shear blender type mixer with bottom drive blades as per the API specification (API specifications 10B, 2012). In all experiments, the wet mixing method has been implemented in which the cement, additives, and water are first weighed depending on the cement design. The cement, silica flour, and nano zeolite were blended prior to mixing with water. Both liquid and dry additives which include fluid loss control additives, retarder, expanding agent, density reducing additives, density enhancing weighing agents, friction reducing agents, defoamer etc. were first mixed in tap water at a low speed of 4000 rpm. The cement, silica flour, and nano zeolite dry blended mixture was subsequently added to the water and then to the additive mixture in the blender. The whole slurry was then mixed at high speed of 12,000 rpm for 35 seconds. After the mixing, the cement slurry was conditioned in atmospheric consistometer at atmospheric pressure and 190° F. temperature for 30 minutes Density The density of cement was evaluated by using a pressurized mud balance. A pressurized mud balance removes any entrapped air and gives accurate density. Cement slurry is prepared according to API specifications and conditioned at 190° F. and atmospheric pressure. Conditioned slurry was then used for density measurement.

Free Water Content Test

The free fluid test helps determine the capacity of the cement slurry to prevent fluid separation in static conditions—both during placement, and after the slurry has been placed into the wellbore. Excessive free fluid in the slurry may cause problems with water pockets, channeling, sedimentation, zonal isolation, etc. For the measurement of free fluid contents, the cement slurry was prepared and conditioned at 190° F. as explained earlier. Cement was then poured into a graduated cylinder up to the 250 mL mark, and was covered with aluminum foil to prevent evaporation for 2 hours. Later, the amount of water on top was measured in milliliters (mL).

Rheological Properties Test

Rheological properties are measured using variable speed rheometer. The conditioned slurry is poured into the rheometer cup that was pre-conditioned at 190° F. The slurry is stirred for about 10 seconds at 3 rpm, 6 rpm, 100 rpm, 200 rpm, and 300 rpm. Viscosity readings are recorded at every speed, first in ascending order and then in descending order. Rheological properties including plastic viscosity (PV) and yield point (YP) are calculated with Bingham Plastic model using the average viscosity values at different speeds.

As per API specifications, gel strengths may be measured on the same slurry after the rheology tests. The slurry was stirred for 60 s at 300 rpm to make it homogenous. Then viscometer was stopped for 10 seconds and then started at 3 rpm; the maximum value recorded is called "initial gel" or "10 sec gel." Later, the slurry was kept static for 10 minutes, and then the rheometer was started at 3 rpm. The maximum dial reading obtained here is to called the "10-minute gel."

Thickening Time

The thickening time of cement slurry may be defined as the length of time that the slurry will remain pumpable in well conditions. To determine the thickening time, the consistency of cement slurry, expressed in Bearden units of consistency (Bc), is measured using the HPHT consistometer. For the thickening time test, the slurry is not conditioned in an atmospheric consistometer. The time at which the consistency value reached 100 Bc was considered as thickening time. The thickening time test was performed at a temperature of 228° F. based on BHCT of the selected well and a pressure of 9400 psi. The pressure was calculated by adding hydrostatic pressure exerted by mud column to surface pump pressure. The time for heating rate was selected as 49 minutes which is the time it would take for a cement slurry to reach the bottom of a well bore.

Static Fluid Loss Test

A fluid loss test is performed to evaluate the amount of fluid loss from the slurry, at given temperature and pressure conditions, using non-stirring fluid loss equipment. Static fluid loss test was performed at 190° F. and 1000 psi pressure as per API standards. Cement slurry is prepared and conditioned as explained earlier before subjecting it to test conditions for 30 minutes. At the end of the test, the amount of collected fluid loss is measured using a graduated cylinder.

Compressive Strength Test

The compressive strength is one of the most important properties of cement, which will determine the integrity of cement and the ability of cement sheath to resist against induced stresses over the life of a well. Two methods are employed to determine the compressive strength of cement. The first is the non-destructive sonic determination of the compressive strength of the cement, which uses an Ultrasonic Cement Analyzer (UCA). The second is the destructive method of Unconfined Compressive Strength (UCS) by applying a load to square-inch cement cubes (crush strength test).

UCA gives the compressive strength development of the slurry over the time based on the time required for the ultrasonic signal to pass through the cement as it sets. In this method, the cement slurry was prepared and conditioned as described earlier, and then it was kept in the UCA for 48 hours. The temperature was raised to BHCT 228° F. in 49 minutes (time to reach bottom) and then increased to BHST 290° F. in 191 minutes with a pressure of 3000 psi.

The crush strength test provides the strength of a cement slurry after it has been pumped into the well and allowed to set in static conditions. The slurry is subjected to temperature and pressure for various lengths of time as per the well conditions and requirements. Cement cubes are cured using molds in a curing autoclave. After demolding, the cured cubes are crushed in uniaxial crushing equipment to measure the maximum load the cement may bear before crushing, which is then used to compute compressive strength. In this method, cement cubes are prepared using molds which are cured at BHST of 290° F. and pressure 3000 psi for 24 hours in curing autoclave. After demolding, cured cubes were crushed in uniaxial crushing equipment to measure unconfined compressive strength.

Tensile Strength Test

For tensile strength, indirect method of Splitting Tensile Strength (STS) is used in the current study as described in ASTM Standard C496. Cylinders of dimension 3 in. length and 1.5 in. diameter (L/D ratio=2) were molded and cured for 24 hours by same pressure and temperature schedule described for the crushing strength test. After removing the cylinders from molds, small wooden strips of thickness ⅛ in. and width 1 in. were placed on the top and bottom of the cylinder so that the load would be distributed uniformly. The cylinders are placed in a horizontal direction and then crushed.

Porosity and Permeability Test

Plug samples were drilled out from untested cubes of cement. The samples were then end face grinded to obtain a clean parallel surface. These core samples were dried under vacuum for about one day. The average length and diameter of the core plugs were determined from four different points along the plug. The dry weights of the core plugs were recorded. The porosity and permeability were measured under confining pressure of 500 psi using an automated Permeameter/Porosimeter.

The examples that follow are related to two types of cement compositions:

Example 2

Cement and water with nano zeolite at various percentages.

Example 3

Cement, water, nano zeolite at various percentages together with a host of other additives used in HPHT field mixes including silica flour, dispersant, retarder, fluid loss control agents, expanding agent, and antifoaming agent.

Example 2

Nano Zeolite with Class G Cement

Several tests were performed to investigate the effect of adding the nano zeolite on the properties of neat class G cement without other cement additives. The tested cement sample used in this example consisted of Saudi cement type class G, nano zeolite, and water.

Cement Slurry Design

The normal slurry density of 15.8 lb/gal was used with the recommended water/cement ratio of 0.44 for class G cement as specified in API Spec 10A. The effect of nano zeolite on various cement properties was examined at various nano zeolite dosages of 0-3%. The slurry composition for all the mix designs used in Example 2 is shown in Table 3.

TABLE 3

Cement slurry design

| Component | Mass percentage by weight of cement | | | |
|---|---|---|---|---|
| Class-G cement | 100 | 100 | 100 | 100 |
| Water | 44 | 44 | 44 | 44 |
| Nano zeolite | 0 | 1 | 2 | 3 |
| Mix design label | G | G1 | G2 | G3 |

PV and YP of Cement Composition with Nano Zeolite

Cement rheology properties, including the plastic viscosity (PV), yield point (YP), and gel strength of a cement composition, are used in describing the quality of the final cement product and predicting its future performance in a working environment, as well as its physical properties during and after cement processing. Cement compositions with 0, 1, and 2% of nano zeolite was prepared and tested for PV and YP. Experimental results show that the addition of nano zeolite to the Type-G cement mix resulted in enhancement in the rheological cement properties such as the plastic viscosity and yield point as illustrated in Table 4. Nano zeolite caused an increase in cement solid particles that in turn increased the plastic viscosity and caused enhancement in cement viscosity. By previous methods not using a nano zeolite, improvements in plastic viscosity and yield point have only been miniscule. It may be concluded that rheological properties (PV and YP) of Class-G cement were improved, which would be beneficial for high temperature wells.

Gel Strength of Cement Composition with Nano Zeolite

Gel strength may be defined as a measure of the attractive forces between the particles of the produced cement, which cause gelation development when the flow stops. It may also give the field operator a quick idea of cement gelation, and if there is settling within the produced cement. It was observed that the gel strength has increased with increasing the amount of nano zeolite. It is obvious that the addition of nano zeolite increases the 10-sec gel strength up to 25% with 1% nano zeolite, but the 2% nano zeolite did not cause a significant increase as compared to 1% composition as shown in Table 4. However, when the cement slurry is subjected to a 10-min gel strength test, for the 1% nano zeolite mix, an almost 67% increase was observed in the 10-min gel strength as compared to the 0% nano zeolite. The 10-min gel strength value for 2% nano zeolite was close to the 1% nano zeolite composition. It may be deduced that the particle suspension ability of cement slurry may be improved with nano zeolite.

TABLE 4

Effect of nano zeolite on rheological properties

| | Rheology | | Gel Strength | |
|---|---|---|---|---|
| Property | PV, cp | YP, lb/100 ft$^2$ | 10-sec | 10-min |
| G | 70 | 20 | 16 | 51 |
| G1 | 82 | 24 | 20 | 85 |
| G2 | 99 | 25 | 21 | 88 |

Compressive Strength of Cement Composition with Nano Zeolite

Four cement systems containing nano zeolite 0, 1, 2, and 3% bwoc were tested using sonic method by ultrasonic cement analyzer (UCA) to measure the evolution of compressive strength. Tests were conducted according to the API specification 10B at a curing temperature of 290° F. and pressure of 3000 psi. The compressive strength of the nanozeolite cement compositions after 6, 12, 18, 24 hours are shown in Table 5.

Figure 3:
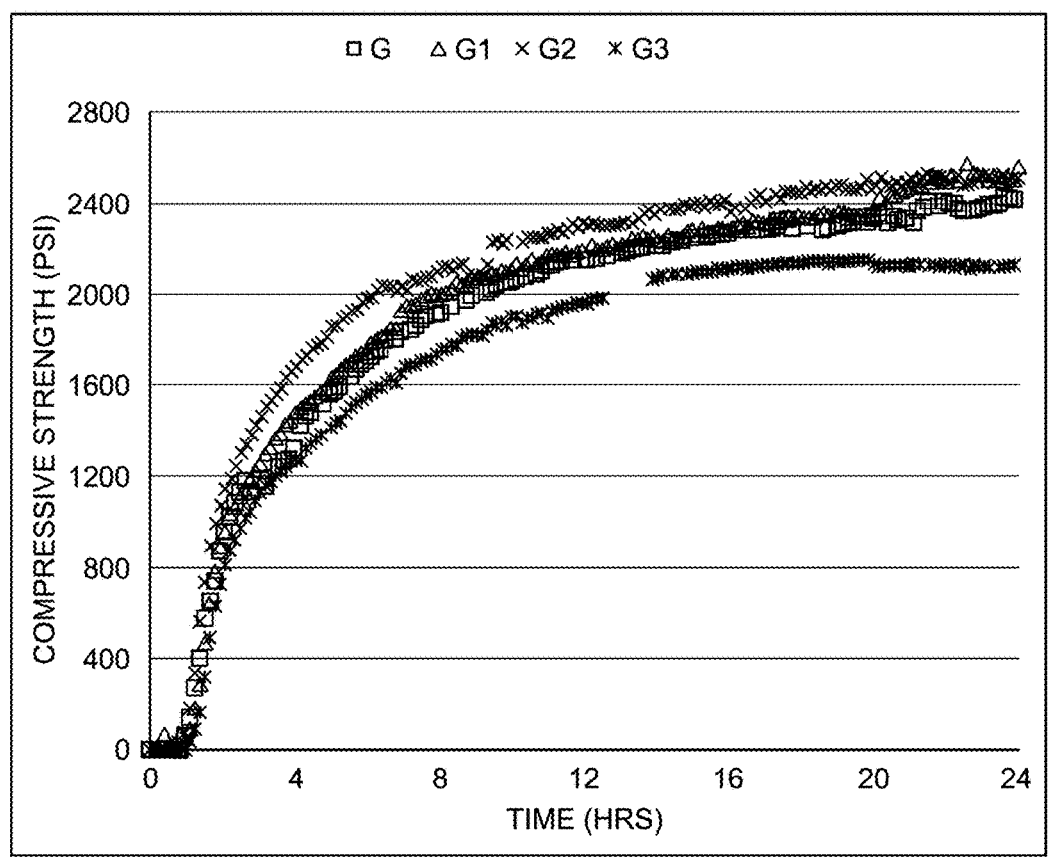
FIG. 3 is a graph of the compressive strength of the G, G1, G2, and G3 slurry mixes over time.

It may be seen from Table 3 that 1 and 2% nano zeolite slurries gave higher strength compared to the Type-G cement mix and the cement composition with 3% nano zeolite. Improved early strength development behavior was observed with the addition of the 2% nano zeolite. The evolution of compressive strength over time for these cement compositions is shown in FIG. 3.

TABLE 5

Effect of nano zeolite on compressive strength

| | Compressive strength, psi | | | |
|---|---|---|---|---|
| Time, hours | G | G1 | G2 | G3 |
| 06:00 | 1730 | 1743 | 1983 | 1554 |
| 12:00 | 2170 | 2180 | 2312 | 1976 |
| 18:00 | 2320 | 2337 | 2444 | 2135 |
| 24:00 | 2430 | 2546 | 2500 | 2100 |

The transition period between development of compressive strength of 50 psi and 500 psi is important, and for well cementing it should be as short as possible to avoid a long waiting time on cement before resuming drilling operation. The 2% nanozeolite cement slurry has the shortest transition time. The times to achieve 50, 500, and 2000 psi compressive strength for the nano zeolite cement slurries are summarized in Table 6. The time to reach a compressive strength of 2000 psi is important as the 2000 psi strength is considered safe for a perforation or stimulation job. It was observed that nano zeolite slurries with 1% and 2% nano zeolite reach 2000 psi more quickly than neat class G cement. Cement compositions with 2% nano zeolite decrease the time to reach 2000 psi from 9 hours to 6 hours, whereas 3% nano zeolite increases the time from 9 hours to 12.5 hours. A time reduction of almost 30% was observed with 2% nano zeolite to reach 2000 psi. Such a reduction will help in reducing the cement waiting time.

TABLE 6

Time to gain compressive strengths of 50, 500, and 2000 psi.

| Compressive Strength (Psi) | G | G1 | G2 | G3 |
|---|---|---|---|---|
| | | Time (Hours) | | |
| 50 | 0.95 | 1.02 | 0.9 | 1.15 |
| 500 | 1.47 | 1.55 | 1.35 | 1.67 |
| 2000 | 8.97 | 8.07 | 6.18 | 12.58 |

Porosity and Permeability of Nano Zeolite Compositions

Permeability is an important property, which controls the ability of the fluid to flow at different pressures, and governs the long-term performance of the cement sheath. The main function of the cement sheath is to seal the formation zones and stop the fluid from moving between them. This may be achieved only if a lower permeability cement sheath is obtained. Porosity is also as important as permeability, and is defined as a void space in the cement sheath where fluids are stored, which at later stages, may affect the long-term durability of the cement sheath. The porosity and permeability of cement compositions with 0, 1, and 3% nano zeolite are shown in Table 7.

Addition of nano zeolite at 1% by weight of cement (bwoc) decreases the porosity of the cement mix by 17%. However, a further increase in nano zeolite concentration increases the porosity as shown in Table 7. On the other hand, a significant reduction of 98% in the permeability results was observed when 1% of nano zeolite was added to the cement mix.

TABLE 7

Effect of nano zeolite on porosity and permeability

| Property | Porosity, % | Permeability, md |
|---|---|---|
| G | 25.76 | 0.3263 |
| G1 | 21.48 | 0.0073 |
| G3 | 30.31 | 0.2984 |

Microstructural Analysis

Figure 6A:
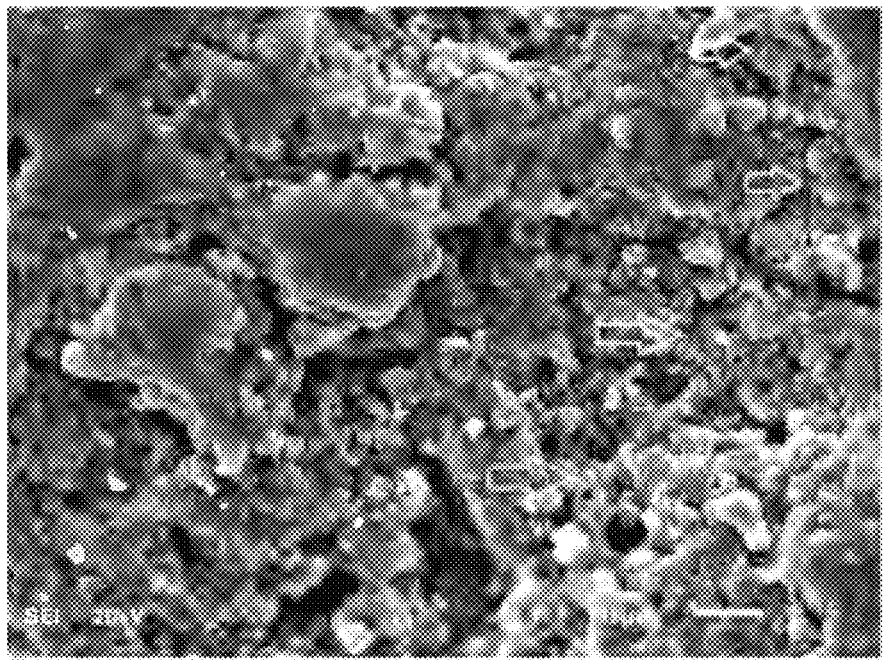
FIG. 6A is an SEM image of the G mix cured at HPHT for 24 hours.
Figure 6B:
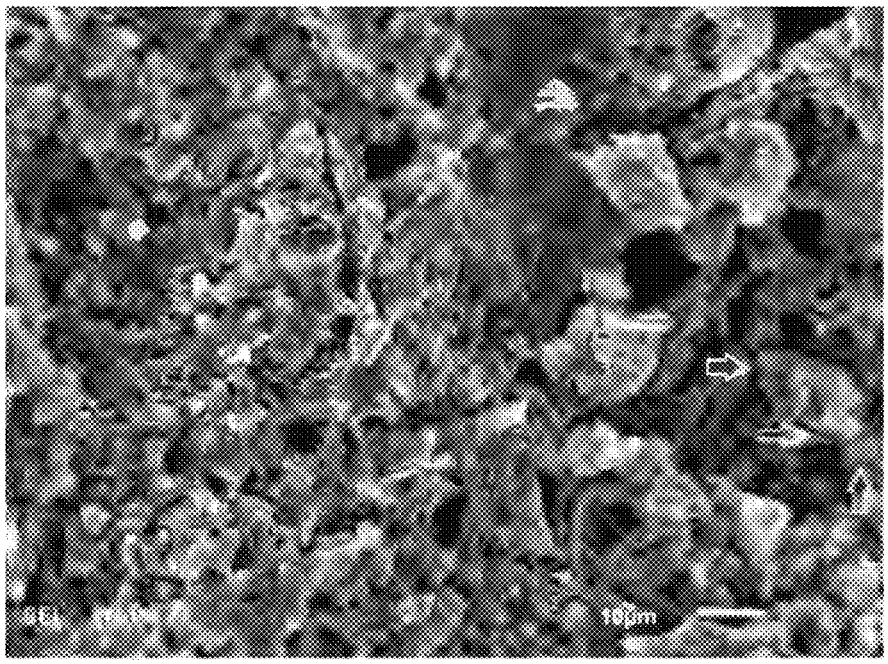
FIG. 6B is an SEM image of the G1 mix cured at HPHT for 24 hours.
Figure 6C:
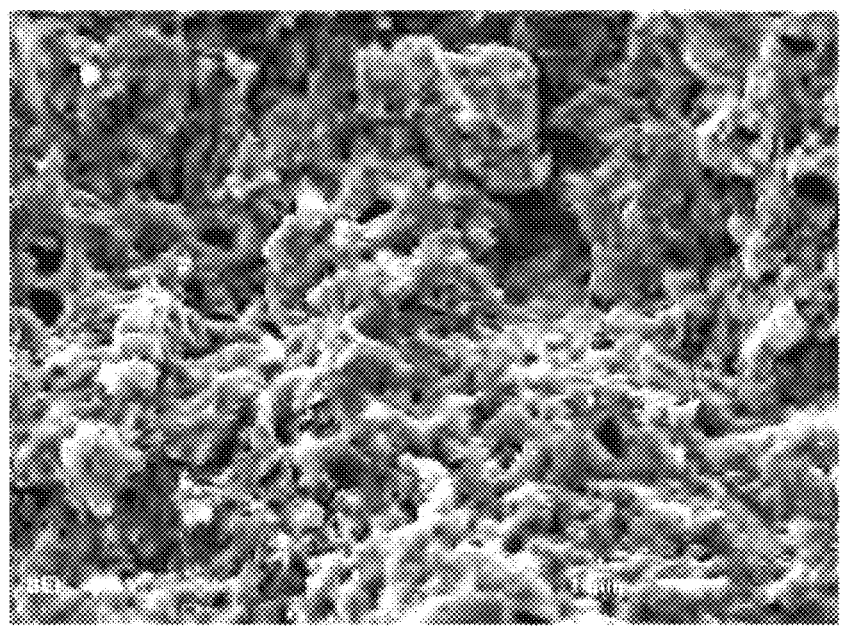
FIG. 6C is an SEM image of the G2 mix cured at HPHT for 24 hours.

The Scanning Electron Microscopy (SEM) of the cement mixes was carried out to identify the composition, topography, and the pore structure of the final cement product. Four cement systems containing class G cement, water, and 0, 1, 2, or 3% nano zeolite were prepared and tested for the microstructural test of SEM. FIGS. 6A, 6B, and 6C show SEM images of hydration products with 0%, 1%, and 2% nano zeolite, respectively, cured at HPHT for 24 hours. Micro cracks are visible in the case of 0% and 1% nano zeolite slurry, as shown by the white arrows. Pore spaces are denoted by ellipses. When 2% nano zeolite was added to the cement mix, it is evident that no micro cracks were seen in the mix. A denser microstructure may be observed with fewer pore spaces for the 2% nano zeolite cement composition.

Figure 7A:
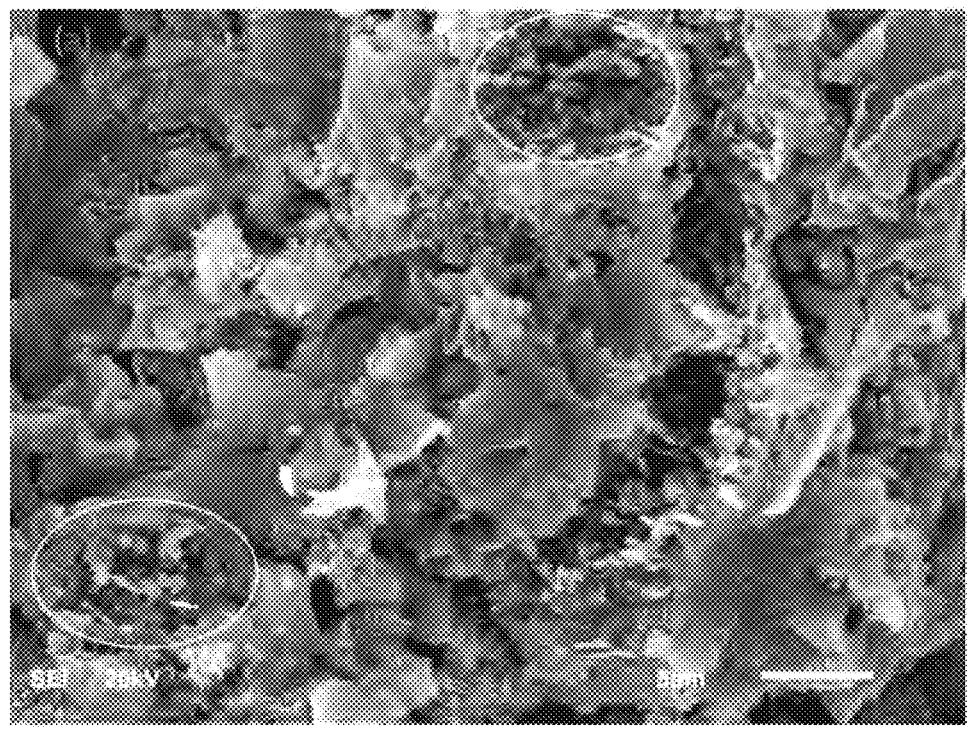
FIG. 7A is an SEM image with higher magnification of the G1 mix cured at HPHT for 24 hours.
Figure 7B:
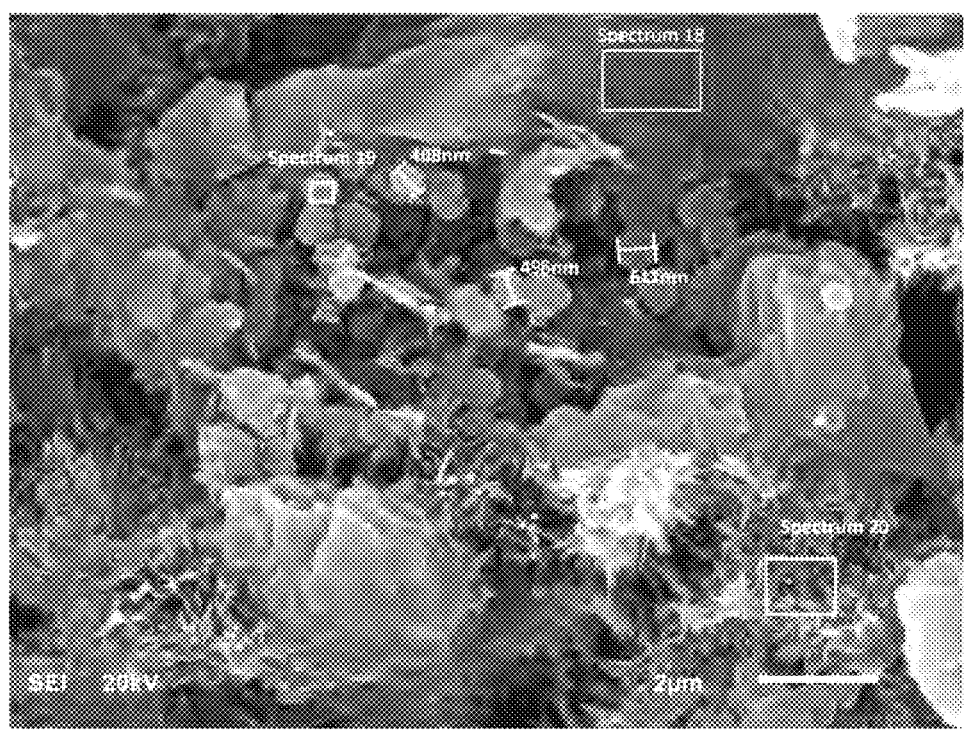
FIG. 7B is an SEM image with higher magnification of the G1 mix cured at HPHT for 24 hours.
Figure 7C:
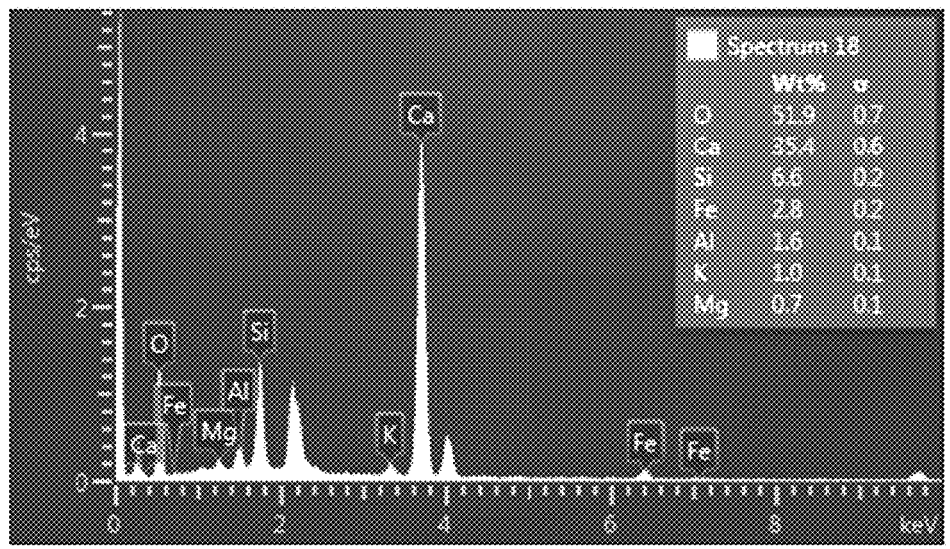
FIG. 7C is the EDS from the Spectrum 18 region in FIG. 7B.
Figure 7D:
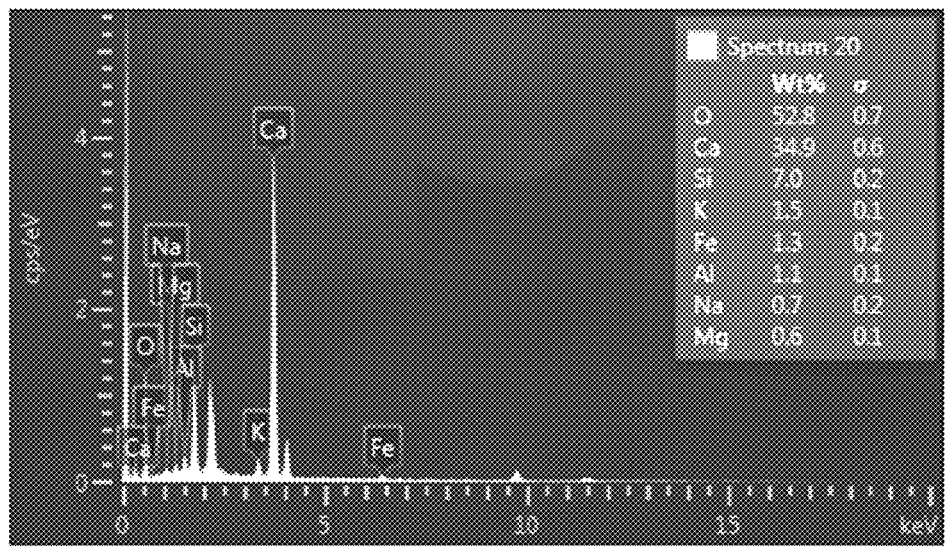
FIG. 7D is the EDS from the Spectrum 20 region in FIG. 7B.
Figure 7E:
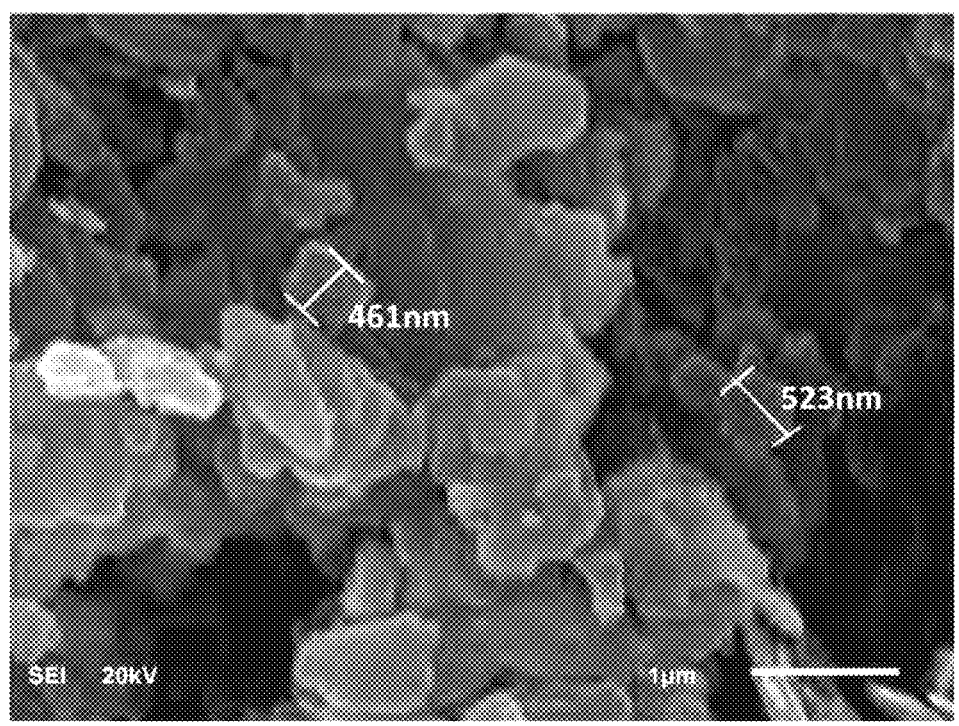
FIG. 7E is an SEM image of nano zeolites.
Figure 7F:
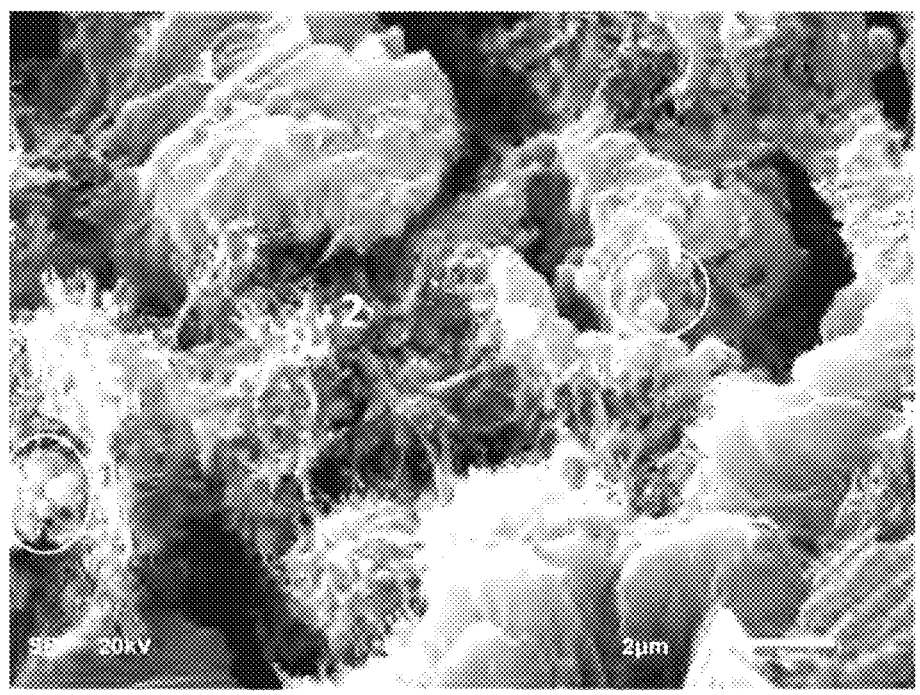
FIG. 7F is a magnified SEM image of the G2 mix after curing at HPHT for 24 hours.

FIGS. 7A and 7F show magnified SEM images of hydration products with 1% and 2% nano zeolite mix, respectively, cured at HPHT for 24 hours. Unreacted particles of nano zeolite appear to be filling the pore spaces in the set cement, which unreacted particles are highlighted by white circles. The lower left white circle of FIG. 7A is magnified in FIG. 7B These SEM images confirm that nano zeolite is acting as a nano-filler in the cement matrix. As a result, these images provide the dense microstructure which is evident from SEM images. The hydration products are further modified with the increase in nano zeolite concentration. As compared to 1% nano zeolite, the 2% nano zeolite sample (FIG. 7F) has very few unreacted particles.

The nano zeolite particles act as nucleation sites on which outer CSH particles grow. Nano zeolite particles connected with growth of CSH may be seen in FIG. 7F. Here, the circled areas show the unreacted nano zeolite, which is present at a lower amount than the unreacted nano zeolite of FIG. 7A. In FIG. 7F, the "2" label marks the outer CSH, which is the CSH growing on nano zeolite particles by the nucleation site phenomena.

The compressive strength results of 1% and 2% nano zeolite slurries at 24 hours are similar, but the enhancement in early strength is greater in the case of the 2% nano zeolite slurry. This observation is also validated from the SEM images. Nano zeolite acting as a nucleation site for CSH growth is believed to be the cause of improved early compressive strength.

Example 3

Nano Zeolite with Class G Cement, Silica Flour, and Additives

Several tests were performed to investigate the effect of adding the nano zeolite on the properties of API class G cement with other cement additives to simulate the conditions in a HPHT well. The specimens tested in Example 3 comprise cement type class G, silica flour, cement additives, nano zeolite, and water.

Cement Slurry Design

The chosen well requires a special cement system design since this well is 14,000 ft deep with high pressure and temperature conditions. The selected cement system comprises different additives in which each material contributes and adds chemical and physical properties to make the cementing job successful. Table 8 explains the cement slurry designs tested in this example. The cement composition comprises Cement Type-G, silica flour, expanding agent, dispersant, two types of fluid loss control agents, retarder, water, and nano zeolite at 0, 1, 2, and 3% bwoc. The base mix (BM) with no nanozeolite additive serves to compare the performance of cement compositions with nanozeolites. The water to cement ratio of the cement mixes was kept constant at 0.44. A large percentage of silica flour, 35% bwoc, was used to prevent strength retrogression at high temperature conditions observed in deep wells in cement compositions without silica flour. The slurry used in this example has a 16.8 ppg density.

TABLE 8

Cement slurry design

| Component | Mass percentage by weight of cement (bwoc) | | | |
| --- | --- | --- | --- | --- |
| Cement | 100 | 100 | 100 | 100 |
| Water | 44 | 44 | 44 | 44 |
| Silica flour | 35 | 35 | 35 | 35 |
| Expanding agent | 1 | 1 | 1 | 1 |
| Dispersant | 1 | 1 | 1 | 1 |
| Fluid loss control agent | 0.2 | 0.2 | 0.2 | 0.2 |
| Fluid loss control agent | 0.5 | 0.5 | 0.5 | 0.5 |
| Retarder | 0.7 | 0.7 | 0.7 | 0.7 |
| Nano zeolite | 0 | 1 | 2 | 3 |
| Mix design label | BM | NZ1 | NZ2 | NZ3 |

Effect of Nano Zeolite on Density

The density of cement is critical in drilling and cementing of wells. It may result in either destroying the well formation, or leading to well blowout, especially when cementing deep wells where high density is required. Cement systems with percentages of nano zeolite of 0, 1, 2, and 3% bwoc were prepared, and the density of the produced cement was measured using a pressurized cement balance. Admixing nano zeolite with the cement does not influence density of the cement mix. Both the control mix or the base mix (BM) and the nano zeolite based cement compositions have almost the same density as shown in the Table 9.

Effect of Nano Zeolite on Free Water Content

Water is added to the cement at a fixed water cement ratio to give the cement its appropriate density. If excessive amounts of water added to the cement, water will accumulate at the top, and the cement settles at the bottom. Cement systems with 0, 1, 2, and 3% of nano zeolite were prepared and tested for the free water separation. The addition of nano zeolite to the cement slurry resulted in no free water separation at the top of the cement as observed in Table 9.

TABLE 9

Effect of nano zeolite on density and free water

| Property | Density, lb/gal | Free water, mL/250 mL |
| --- | --- | --- |
| BM | 16.8 | 0 |
| NZ1 | 16.95 | 0 |

TABLE 9-continued

Effect of nano zeolite on density and free water

| Property | Density, lb/gal | Free water, mL/250 mL |
| --- | --- | --- |
| NZ2 | 16.85 | 0 |
| NZ3 | 16.9 | 0 |

Effect of Nano Zeolite on Rheological Properties

Cement compositions with 0, 1, 2, and 3% of nano zeolite were prepared and tested for cement rheological properties including plastic viscosity, yield point, and gel strength. The variability of the rheological properties with different nano zeolite amounts is presented in Table 10. Addition of nano zeolite resulted in an increase in plastic viscosity, which may be attributed to an increase in solid particles. This enhancement makes nano zeolite a good viscosifier, and helps in efficient mud displacement especially in high temperature wells. The yield point was not affected significantly. It is desirable for the cement slurry to have low yield points. The nano zeolite addition improved the 10-min gel strength of cement slurry, as summarized in Table 10, which indicates a better particle suspending ability of cement slurries with nano zeolite.

TABLE 10

Effect of nano zeolite on rheological properties

| Property | Rheology | | Gel Strength | |
| --- | --- | --- | --- | --- |
| | PV, cp | YP, lb/100 ft$^2$ | 10-sec | 10 min |
| BM | 232 | 4 | 6 | 19 |
| NZ1 | 264 | 4 | 6 | 21 |
| NZ2 | 272 | 4 | 7 | 25 |
| NZ3 | 275 | 7 | 7 | 26 |

Effect of Nano Zeolite on Thickening Time

Figure 5:
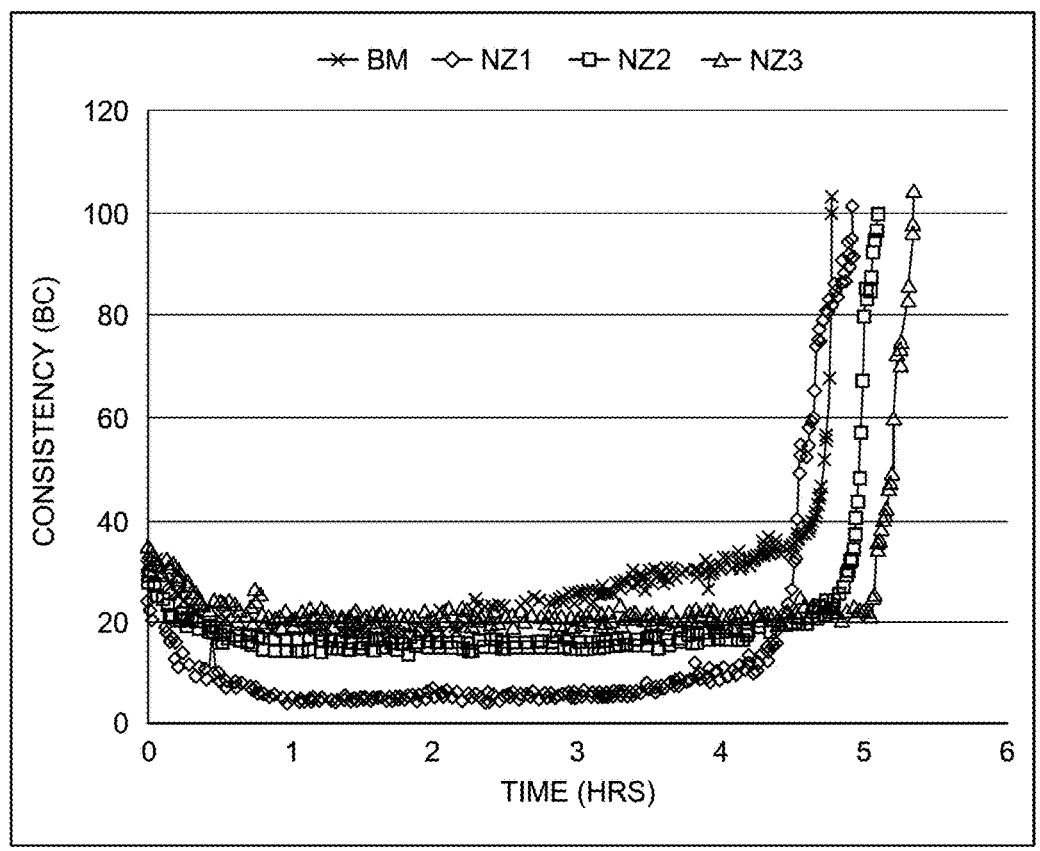
FIG. 5 is a graph of the consistency of BM, NZ1, NZ2, and NZ3 slurry mixes over time for the determination of thickening time.

The thickening times of cement samples containing of 0, 1, 2, and 3% nano zeolite under HPHT conditions were determined to investigate if the nanozeolite has a retarding or an accelerating effect on thickening. The thickening time of cement helps to determining the suitability of using the cement in different work circumstances. The addition of nano zeolite to the cement resulted in a slight increase in the thickening time of the cement compositions as shown in Table 11. Nano zeolite slows the hydration reaction (35 minutes in case of 3% nano zeolite), which may have some advantages in the case of cementing deep wells. Comparison of thickening time behavior of all slurries tested is also presented in FIG. 5.

Effect of Nano Zeolite on Fluid Loss

The effect of nano zeolite on fluid loss of cement compositions containing 0, 1, 2, and 3% nano zeolite as per API specifications is shown in Table 11. The purpose of the fluid loss test is to measure the amount of the fluid lost when the cement is subjected to a differential pressure within the well. Most of the cement losses occur during the cementing of a formation having a high permeability or sensitivity. Measured fluid loss of all cement slurries are less than 50 mL per 30 min which is good in case of both liner cementing and horizontal well cementing. The measured fluid loss was also good for preventing gas channeling as recommended by Al-Yami et al. See Al-Yami, A. S. (2015). An Overview of Different Chemicals Used in Designing Cement Slurries for Oil and Gas Wells. Society of Petroleum Engineers. DOI: 10.2118/175259-MS, incorporated herein by reference in its entirety.

TABLE 11

Effect of nano zeolite on thickening time and fluid loss

| Property | Thickening Time, hours | Fluid loss (API), mL |
|---|---|---|
| BM | 4:46 | 32 |
| NZ1 | 4:54 | 40 |
| NZ2 | 5:05 | 30 |
| NZ3 | 5:20 | 40 |

Ultrasonic Compressive Strength of Nano Zeolite Cement Mixes

Figure 4:
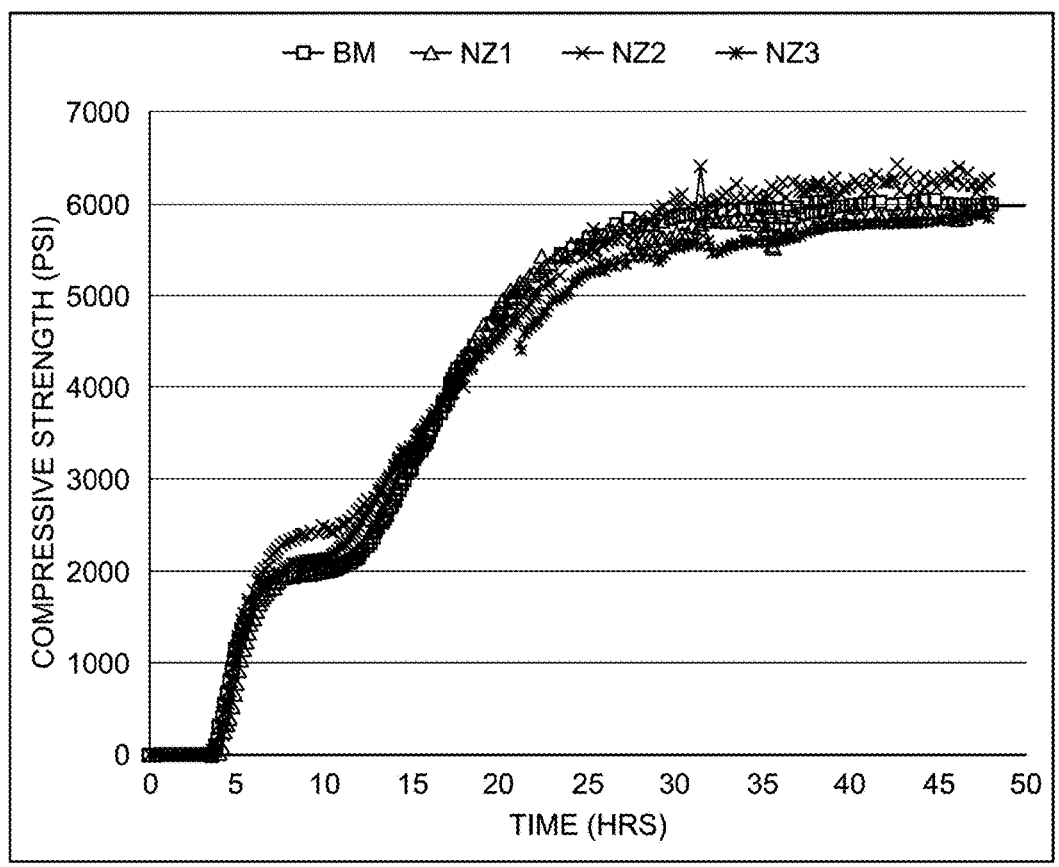
FIG. 4 is a graph of the compressive strength of the BM, NZ1, NZ2, and NZ3 slurry mixes over time.

Cement systems containing nano zeolite at 0, 1, 2, and 3% bwoc were tested for evolution of compressive strength by sonic method (UCA). Tests were conducted according to the temperature and pressure conditions described earlier. The compressive strength of the cement samples is reported after 6, 12, 18, 24, and 48 hours as shown in Table 12. It is clear that 2% nano zeolite gave the highest strength compared to all other mixes. High early strength development was observed with the addition of the 2% nano zeolite, which helps in reducing the waiting on cement time, and as a result, it reduces the cost of the cementing job. The highest compressive strength achieved by sonic method was with the 2% nano zeolite sample; after 48 hours of the curing process, this sample had a compressive strength around 6300 psi, which is 5% greater than the BM sample. The compressive strength development over time for the different cement compositions is shown in FIG. 4.

TABLE 12

Effect of nano zeolite on compressive strength (sonic method)

| Time, hours | Compressive strength, psi | | | |
|---|---|---|---|---|
| | BM | NZ1 | NZ2 | NZ3 |
| 06:00 | 1690 | 1500 | 1858 | 1693 |
| 12:00 | 2223 | 2261 | 2685 | 2529 |
| 18:00 | 4245 | 4342 | 4153 | 4143 |
| 24:00 | 5434 | 5557 | 5435 | 5106 |
| 48:00 | 6019 | 6007 | 6325 | 6013 |

The time for the slurries to achieve compressive strengths of 50, 500, and 2000 psi are summarized in Table 13. The time to reach a strength of 2000 psi is important, as this strength is considered a safe level for a perforation or stimulation job. It was observed that nano zeolite slurries have a shorter time required to reach 2000 psi as compared to the base mix. Rapid and early strength development was achieved with 2% nano zeolite, for instance, the 2000 psi strength level was reached after 6.45 hours, which is considerably faster than the base mix without the addition of nano zeolite (9.35 hours).

TABLE 13

Time to gain compressive strengths (50, 500, and 2000 psi)

| Compressive Strength (psi) | BM | NZ1 | NZ2 | NZ3 |
|---|---|---|---|---|
| | Time (Hours) | | | |
| 50 | 3.73 | 4.12 | 3.94 | 3.62 |
| 500 | 4.25 | 4.7 | 4.44 | 4.22 |
| 2000 | 9.35 | 8.75 | 6.45 | 7.58 |

Crushing Strength and Modulus of Elasticity

Unconfined compressive strength (UCS) is the maximum load per unit surface area a cement specimen may take before failing in a compression test with no confining pressure. Results of UCS tests for the nanozeolite cement compositions are presented in Table 14. It is observed that nano zeolite increases the compressive strength of cement mixes. At 1% nano zeolite, the crushing strength is of the same order as the control mix. However, with 2% nano zeolite cement composition the compressive strength at macro scale increases by about 20% and at 3% it is about 28% higher.

TABLE 14

Effect of nano zeolite on unconfined compressive strength

| Sample | BM | NZ1 | NZ2 | NZ3 |
|---|---|---|---|---|
| 1 | 5000 | 4800 | 5550 | 6450 |
| 2 | — | 5100 | 6400 | 6350 |
| Average (Psi) | 5000 | 4950 | 5975 | 6400 |

Young's modulus results are shown in Table 15, which indicates the increase of Young's modulus with the addition of nano zeolite. A higher Young's modulus indicates set cement samples that have a higher stiffness.

TABLE 15

Effect of nano zeolite on Young's modulus

| | NZ1 | NZ2 | NZ3 |
|---|---|---|---|
| Young's Modulus (MPa) | 1653 | 2179 | 2525 |

Effect of Nano Zeolite on Tensile Strength

If there are enough induced stresses to cause mechanical failure, tensile failure is more likely to happen than compressive failure. Thus, the evaluation of tensile strength is critical for engineers to assess the failure criteria for set cements. See Heinold, T., Dillenbeck, R., Bray, W. et al. 2003. Analysis of Tensile Strength Test Methodologies for Evaluating Oil and Gas Well Cement Systems. Presented at the SPE Annual Technical Conference & Exhibition, Denver, Colo., 5-8 October. SPE-84565-MS, incorporated herein by reference in its entirety. The results of tensile strength tests for nano zeolite cement slurries are given in Table 16. There was no specific trend with the increase in concentration of nano zeolite. The tensile strength of nano zeolite increased with the 1% addition of nano zeolite but then decreased with the 2% nano zeolite concentration. The tensile strength of the 3% nano zeolite cement mix was similar to the 1% nano zeolite slurry.

TABLE 16

Effect of nano zeolite on tensile strength

| Sample | BM | NZ1 | NZ2 | NZ3 |
|---|---|---|---|---|
| 1 | 1100 | 1450 | 1050 | 1400 |
| 2 | 1350 | 1350 | — | — |
| Average (psi) | 1225 | 1400 | 1050 | 1400 |

Effect of Nano Zeolite on Porosity and Permeability

The addition of nano zeolite decreased the porosity and permeability of nano zeolite cement mixes as shown in Table 17. This table shows that the 0% NZ cement slurry had a very low permeability, and that the addition of nano zeolite further reduced the permeability. The cement composition having 1% nano zeolite decreased the porosity slightly below the base mix, but increasing the nano zeolite concentration to 2% increased the porosity. Nano zeolite caused a considerable decrease of 44% and 55% in permeability with 1% and 2% nano zeolite concentrations, both compared to the base mix, respectively, indicating the effect of the nano zeolite to fill empty pores.

TABLE 17

Effect of nano zeolite on porosity and permeability

| Property | Porosity, % | Permeability, md |
|---|---|---|
| BM | 21.57 | 0.0009 |
| NZ1 | 20.51 | 0.0005 |
| NZ2 | 23.35 | 0.0004 |

Example 4

Microstructure

Effective dispersion to avoid nanoparticles agglomeration is the key in improving the microstructure and strength of the cement with nanoparticles. Otherwise, inclusion of nanomaterials may negatively affect the cement properties. Such negative effects may arise with excess nanomaterials, which may agglomerate and produce weak zones that have a significant influence on the bulk material strength. XRD is semi-quantitative analysis, so the percentages given may be approximate, but the trend will be according to the peaks of different crystalline materials observed in the mix. The levels of hydration products in the different cement mixes as estimated by XRD are shown in Table 18.

Nano zeolite reacts with calcium hydroxide (CH), producing calcium silicate hydrates (C—S—H), thus the voids and pores of the cement that receive the nano zeolite contain some amount of CSH product.

As observed by the SEM images, the unreacted nano zeolite increases with the percent addition of nanozeolite in the cement mix. Table 18 shows that the percentage of CSH decreases from 50% (G1) to 15% (G3) as the amount of nano zeolite increases. The table also shows that Portlandite (CH) increases from 10%, to 28%, to 46% as the nano zeolite is increased going from G1 to G2 to G3.

It may be observed that for the G3 sample, the concentration of calcium silicate hydrate (CSH) was reduced significantly while the Portlandite (CH) increased. The CSH levels for the G1 and G2 mixes are higher than for the G mix. These results are in line with the compressive strength results. Higher CSH concentrations are correlated with higher strength and vice versa. Some unreacted silica is also present in the case of higher concentrations of nano zeolite. The amount of unreacted nanozeolite particles cannot be precisely calculated, but the above values indicate its presence in the cement.

TABLE 18

Hydration Products

| Hydration products | G | G1 | G2 | G3 |
|---|---|---|---|---|
| Calcium Silicate Hydrate (CSH) | 43% | 50% | 46% | 15% |
| Calcium silicate (Larnite) | 26% | 24% | 7% | 24% |
| Calcium Hydroxide (CH, Portlandite) | 19% | 10% | 28% | 46% |

TABLE 18-continued

Hydration Products

| Hydration products | G | G1 | G2 | G3 |
|---|---|---|---|---|
| Aluminum Calcium Iron Oxide ($Ca_2FeAlO_5$) | 12% | 16% | 15% | 10% |
| Silicon oxide (Quartz) | 0% | 0% | 4% | 5% |

FIGS. 7A and 7B are SEM images magnified to analyze the smaller particles, which appear to be unreacted nano zeolite particles agglomerated in the mix. These particles are highlighted by white circles as seen in FIG. 7A.

FIG. 7B shows the particle size of smaller particles as estimated by a tool provided in EDS analysis software. The particle size of range 400-600 nm may be seen. In addition, the SEM analysis of nano zeolite gave a similar particle size range of 400-600 nm, indicating the agglomeration of particles (see FIG. 7E).

EDS analysis at different locations is summarized in FIGS. 7C and 7D. Location selected as Spectrum 18 (location shown in FIG. 7B, spectrum shown in FIG. 7C) indicates the high density CSH which is also called as inner product, EDS analysis shows the presence of silica with C/S=3.5. On the other hand, Spectrum 20 (location shown in FIG. 7B, spectrum shown in FIG. 7D) shows the needle like, low density CSH, which is termed as outer product CSH. EDS analysis indicated the C/S ratio of 3.25. It appears that nano zeolite particles are filling the pore space between both high and low density CSH.

SEM analysis of G2 mix with 2% nano zeolite (FIG. 6C) shows no evidence of micro cracks, unlike the G and G1 mixes. G2 appears to be the densest mix among all samples. It may be seen that as the nano zeolite concentration is increased, hydration products are further modified, which may include reducing micro cracks.

From FIG. 7F, it may be observed that there are some unreacted nano zeolite particles left in the mix as highlighted by the white circles, and similar in appearance to the unreacted nano zeolite in the G1 sample (FIG. 7A). However, the amount of unreacted particle is very low in the G2 mix as compared to the G1 mix. It appears that the nano zeolite particles acted as nucleation sites on which outer CSH particles could grow. The magnified image at the same area is presented in FIG. 7F, which confirms nano zeolite acting as nucleation sites as the image shows nano zeolite particles connected with the growth of CSH. The compressive strength results of samples G and G2, as listed in Table 5, show that G2 has an early strength enhancement, but at 24 hours, has an equivalent compressive strength as G1. This observation also validates the nucleation site phenomenon as observed in SEM images.

Figure 8A:
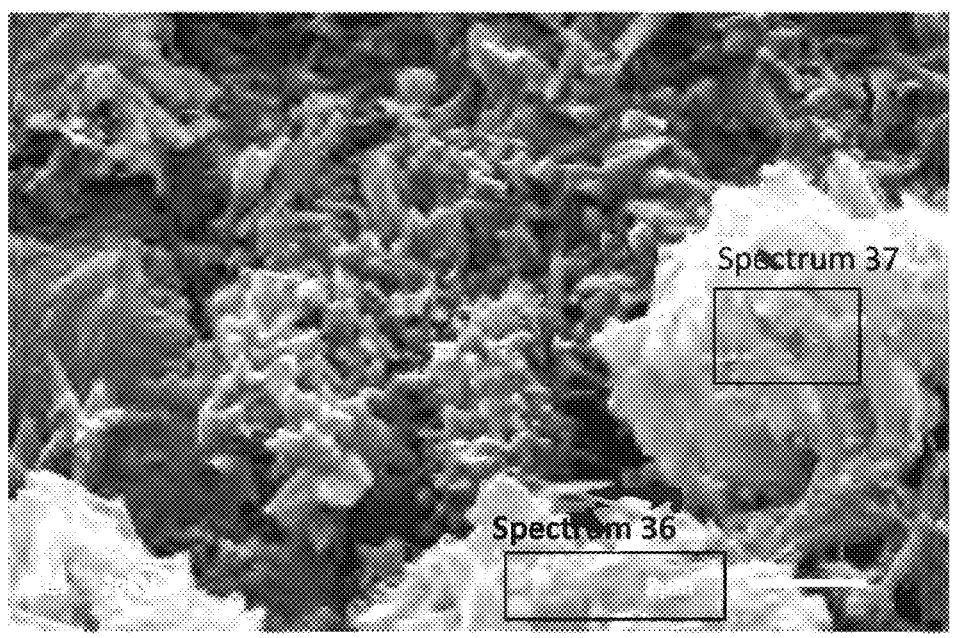
FIG. 8A is an SEM image of the G3 mix.
Figure 8B:
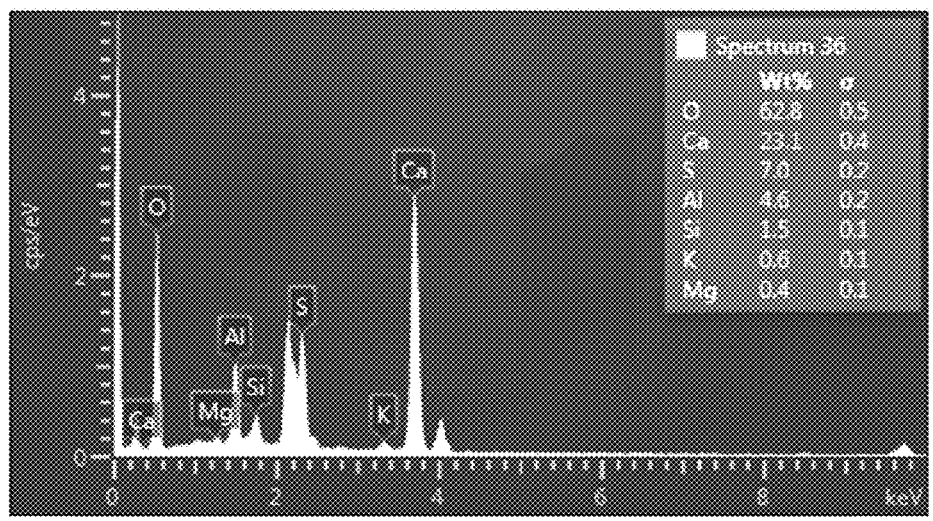
FIG. 8B is the EDS from the Spectrum 36 region in FIG. 8A.
Figure 8C:
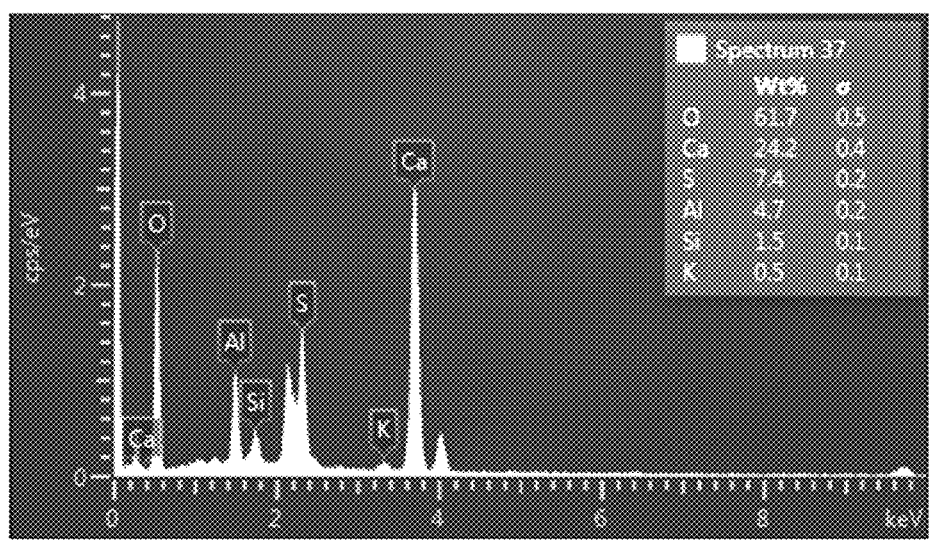
FIG. 8C is the EDS from the Spectrum 37 region in FIG. 8A.

SEM and EDS analysis of G3 mix shows that the mix G3 slurry with 3% Nanozeolite is completely different from what was seen in the other G mixes. The SEM of the G3 mix is shown in FIG. 8A, and the EDS analysis (from Spectrum 36 and Spectrum 37 within FIG. 8A) is shown in FIGS. 8B and 8C.

Flower-like structures are located throughout the mixture and appear to be an agglomeration of smaller rod-like structures. EDS measurement of these rod-like structures (Spectrum 36 and Spectrum 37, in FIGS. 8B and 8C, respectively) show them to be rich in sulphur and aluminum, which suggests some form of ettringite or monosulfate. The significant decrease of G3 mix compressive strength (as shown in Table 5) also confirms the formation of sulfate. These results may also be validated by the significant increases in porosity and permeability as compared to the G1 slurry. The EDS of a flower-like structure revealed some form of CSH with a C/S ratio of 3.

To summarize the results of microstructural analysis, the following conclusions may be made:

The addition of nano zeolite modified the cement hydration products as compared to the neat Class G slurry.

From the SEM images of G and G1 cement slurries, micro cracks are evident, which may be attributed to the strength retrogression at high temperatures. However, as the concentration of nano zeolite increased, micro cracks were no longer observed.

Both inner product and outer product CSH (high density and low density) were observed in G1 mix, implying the effect of nano zeolite particles on cement hydration.

From the SEM image of G1, agglomeration of nanomaterial may be seen in pore spaces, which confirms the nano-filler effect of the nano zeolite. Porosity and permeability results also validated the nano-filler effect, as G1 had significantly lower porosity and permeability values.

In addition, it is observed that there may be a need for effective dispersion of nano zeolite particles as many of them agglomerated in some pore spaces while other pore spaces were left open. This explains why significant reductions in porosity and permeability did not always correlate with higher compressive strength.

The invention claimed is:

1. A method of pumping a wet cement slurry into a well bore and making a cured cement material, comprising:
   mixing
      a hydraulic cement;
      water and/or brine in an amount of 40-50% by weight of the hydraulic cement; and
      0.5-4 wt % zeolite nanoparticles by weight of the hydraulic cement to form the wet cement slurry;
   pumping the wet cement slurry into the annular space between a pine and a formation rock in a well bore; then
   curing the wet cement slurry to produce the cured cement material,
   wherein the cured cement material comprises zeolite clusters having an average cluster diameter of 1-12 μm,
   wherein the zeolite nanoparticles have an average diameter of 40-100 nm,
   wherein the cured cement material is porous, with pores having an average diameter of 1-12 μm, and
   wherein a subset of the zeolite clusters is located within the pores.

2. The method of claim 1, wherein the hydraulic cement is selected from the group consisting of an API Class A Portland cement, an API Class G Portland cement, an API Class H Portland cement, and a Saudi Class G hydraulic cement.

3. The method of claim 1, wherein the zeolite nanoparticles have a silica to alumina mass ratio of 1.2:1-3.0:1.

4. The method of claim 1, wherein the zeolite nanoparticles comprise 1-6 wt % CaO relative to a total weight of the zeolite nanoparticles.

5. The method of claim 1, wherein the wet cement slurry reaches a compressive strength of 2,000 psi within a time of curing which is 0.8-3.0 h faster than an essentially identical wet cement slurry that was not formed with zeolite nanoparticles.

6. The method of claim 1, wherein the wet cement slurry further comprises at least one additive selected from the group consisting of an expanding agent, a dispersant, a fluid loss control agent, a retarder, a defoamer, a density reducing additive, a density enhancing weighting agent, a foaming agent, and a friction reducing agent.

7. The method of claim 6, wherein the cured cement material has a compressive strength of 5,500-6,800 psi.

8. The method of claim 6, wherein the wet cement slurry reaches a compressive strength of 2,000 psi within a time of curing which is 1.5-3.5 h faster than an essentially identical wet cement slurry that was not formed with zeolite nanoparticles.

9. The method of claim 1, wherein the cured cement material has a weight of calcium silicate hydrate that is 20-70% lower than a second weight of calcium silicate hydrate of an essentially identical cured cement material made from a wet cement slurry that does not contain zeolite nanoparticles, relative to the second weight.

10. The method of claim 1, wherein the cured cement material has a weight of calcium hydroxide that is greater by a factor of 1.5-3.0 than a second weight of calcium hydroxide of an essentially identical cured cement material made from a wet cement slurry that does not contain zeolite nanoparticles.

* * * * *